(12) United States Patent
Jindal et al.

(10) Patent No.: US 11,681,593 B2
(45) Date of Patent: Jun. 20, 2023

(54) SELECTING A WITNESS SERVICE WHEN IMPLEMENTING A RECOVERY PLAN

(71) Applicant: Nutanix, Inc., San Jose, CA (US)

(72) Inventors: Ankush Jindal, Bengaluru (IN); Kiran Tatiparthi, Dublin, CA (US); Sharad Maheshwari, Benagaluru (IN); Shubham Gupta, Etah (IN); Bharat Kumar Beedu, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 31 days.

(21) Appl. No.: 17/246,565

(22) Filed: Apr. 30, 2021

(65) Prior Publication Data
US 2022/0229746 A1 Jul. 21, 2022

(30) Foreign Application Priority Data
Jan. 16, 2021 (IN) .............................. 202141002109

(51) Int. Cl.
*G06F 11/20* (2006.01)
*G06F 9/455* (2018.01)

(52) U.S. Cl.
CPC ...... *G06F 11/2023* (2013.01); *G06F 9/45558* (2013.01); *G06F 2201/815* (2013.01)

(58) Field of Classification Search
CPC ............. G06F 9/45558; G06F 9/4557; G06F 9/45575; G06F 2201/815; G06F 11/2023; G06F 11/203; G06F 11/2033; G06F 11/2025
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 9,189,339 | B1 * | 11/2015 | Cohen ................. G06F 11/2074 |
| 9,772,866 | B1 | 9/2017 | Aron et al. |

(Continued)

OTHER PUBLICATIONS

A good Cloud use case: Failover Cluster quorum witness https://tech-addict.fr/a-good-cloud-use-case-failover-cluster-quorum-witness/ Feb. 24, 2019 (Year: 2019).*

(Continued)

*Primary Examiner* — Joseph O Schell
(74) *Attorney, Agent, or Firm* — Vista IP Law Group, LLP

(57) ABSTRACT

Methods, systems, and computer program products for selection of a witness during virtualization system recovery after a disaster event. A recovery plan is configured to identify a witness that is then used to elect a leader to implement the recovery. Various system, and/or network, and/or component failures and/or various loss of function of components of the virtualization system can trigger initiation of the recovery plan. Based on the particular recovery plan that is invoked upon a determination of a network outage, or component failure or loss of function of a component of the virtualization system, a particular witness corresponding to a subset of entities of the particular recovery plan is selected. The witness is used to elect the leader, and the leader initiates actions of the recovery plan. The implementation of the recovery plan includes consideration of the health of components that would potentially be involved in the recovery actions.

21 Claims, 16 Drawing Sheets

(56) References Cited

U.S. PATENT DOCUMENTS

| | | | |
|---|---|---|---|
| 10,409,988 B2* | 9/2019 | Reinecke | G06F 21/568 |
| 2015/0363282 A1* | 12/2015 | Rangasamy | G06F 11/00 |
| | | | 714/4.12 |
| 2015/0370660 A1* | 12/2015 | Pershin | G06F 11/0772 |
| | | | 714/4.11 |
| 2016/0179635 A1* | 6/2016 | Kondalsamy | G06F 11/00 |
| | | | 714/4.12 |
| 2017/0060639 A1* | 3/2017 | Miller | G06F 9/5038 |
| 2019/0317789 A1* | 10/2019 | Chakraborty | G06F 9/45558 |
| 2020/0026625 A1* | 1/2020 | Konka | G06F 11/2028 |

OTHER PUBLICATIONS

Poitras, Steven. "TheNutanix Bible" (Oct. 15, 2013), from http://stevenpoitras.com/the-nutanix-bible/ (Publication date based on indicated capture date by Archive.org; first publication date unknown).

Poitras, Steven. "TheNutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "TheNutanix Bible" (Jan. 7, 2015), from http://stevenpoitras.com/the-nutanix-bible/ (Publication date based on indicated capture date by Archive.org; first publication date unknown).

Poitras, Steven. "TheNutanix Bible" (Jun. 9, 2015), from http://stevenpoitras.com/the-nutanix-bible/ (Publication date based on indicated capture date by Archive.org; first publication date unknown).

Poitras, Steven. "TheNutanix Bible" (Sep. 4, 2015), from https://nutanixbible.com/.

Poitras, Steven. "TheNutanix Bible" (Jan. 12, 2016), from https://nutanixbible.com/.

Poitras, Steven. "TheNutanix Bible" (Jun. 9, 2016), from https://nutanixbible.com/.

Poitras, Steven. "TheNutanix Bible" (Jan. 3, 2017), from https://nutanixbible.com/.

Poitras, Steven. "TheNutanix Bible" (Jun. 8, 2017), from https://nutanixbible.com/.

Poitras, Steven. "TheNutanix Bible" (Jan. 3, 2018), from https://nutanixbible.com/.

Poitras, Steven. "TheNutanix Bible" (Jun. 25, 2018), from https://nutanixbible.com/.

Poitras, Steven. "TheNutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "TheNutanix Bible" (Jan. 30, 2021), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

"Disaster Recovery for Azure VMS with Site Recovery," samcogan, dated May 31, 2017, URL: https://samcogan.com/disaster-recovery-for-azure-vms-with-site-recovery/.

"About recovery plans," Microsoft, dated Jan. 14, 2022, URL: https://docs.microsoft.com/en-us/azure/site-recovery/recovery-plan-overview.

"IBM VM Recovery Manager HA for Power Systems, Version 1.4.0," International Business Machines Corporation, Copyright 2019.

"Protect your Hyper-V Virtual Machines with Azure Site Recovery and Windows Admin Center," Microsoft, dated Dec. 23, 2021, URL: https://docs.microsoft.com/en-us/windows-server/manage/windows-admin-center/azure/azure-site-recovery.

"New-AzRecoveryServicesAsrRecoveryPlan," Microsoft, date found via Google as Dec. 19, 2018, URL: https://docs.microsoft.com/en-us/powershell/module/az.recoveryservices/new-azrecoveryservicesasr-recoveryplan?view=azps-7.4.0&viewFallbackFrom=azps-5.5.0.

Potheri, M., "Disaster Recovery for Virtualized Business Critical Applications (Part 2 of 3)," VMWare, dated Oct. 15, 2014, URL: https://blogs.vmware.com/apps/2014/10/dr_bca_part2.html.

"Actifio Resiliency Director Server User Guide," Actifio, Inc., Copyright 2019.

"SRM 5.5 Recovery Plans," The IT Hollow, date found via Google as Oct. 27, 2013, URL: https://theithollow.com/site-recovery-manager-5-5-guide/srm-5-5-recovery-plans/.

Poitras, Steven. "The Nutanix Bible" (Sep. 9, 2022), from https://nutanixbible.com/ (Publication date based on indicated capture date by Archive.org; first publication date unknown).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

* cited by examiner

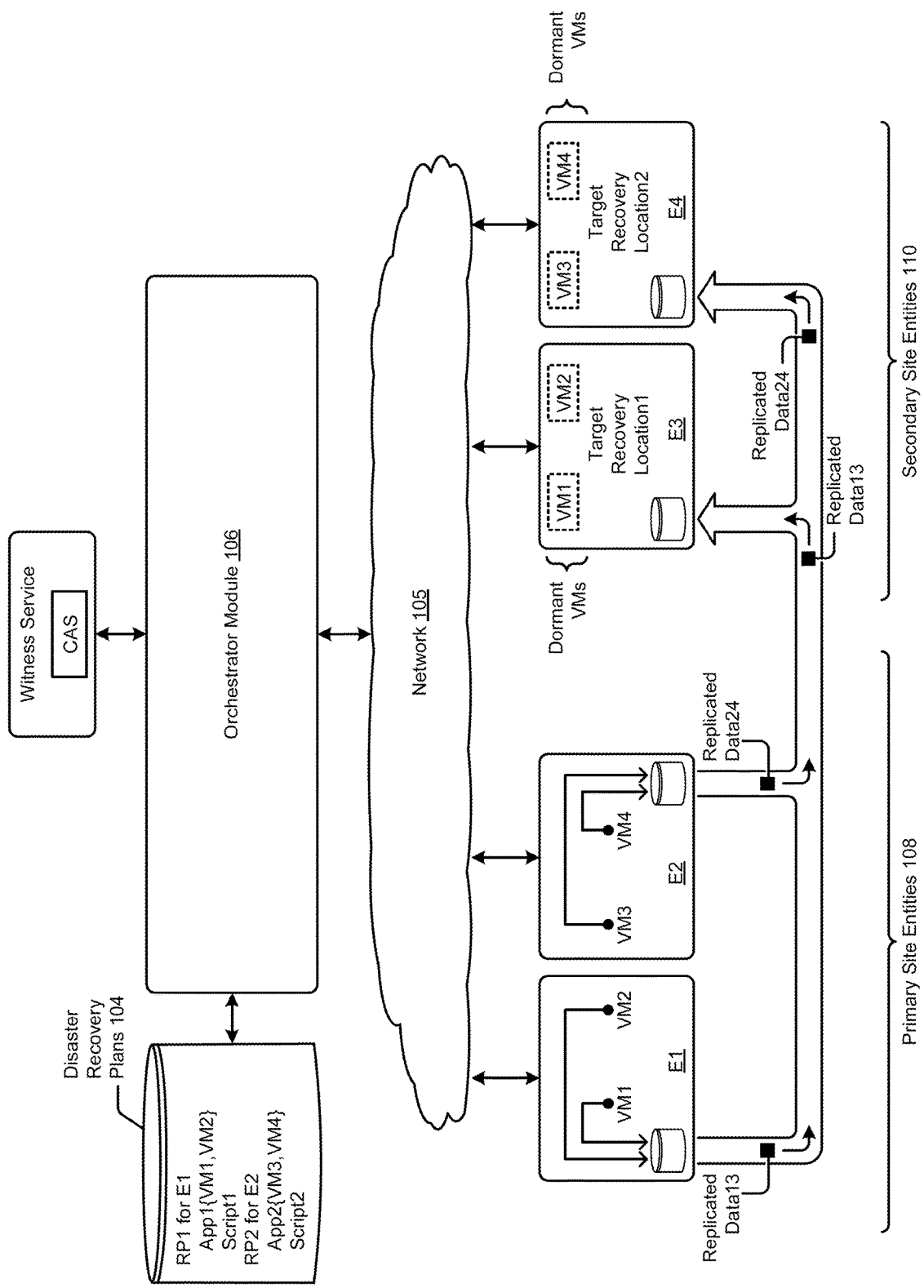
FIG. 1A1

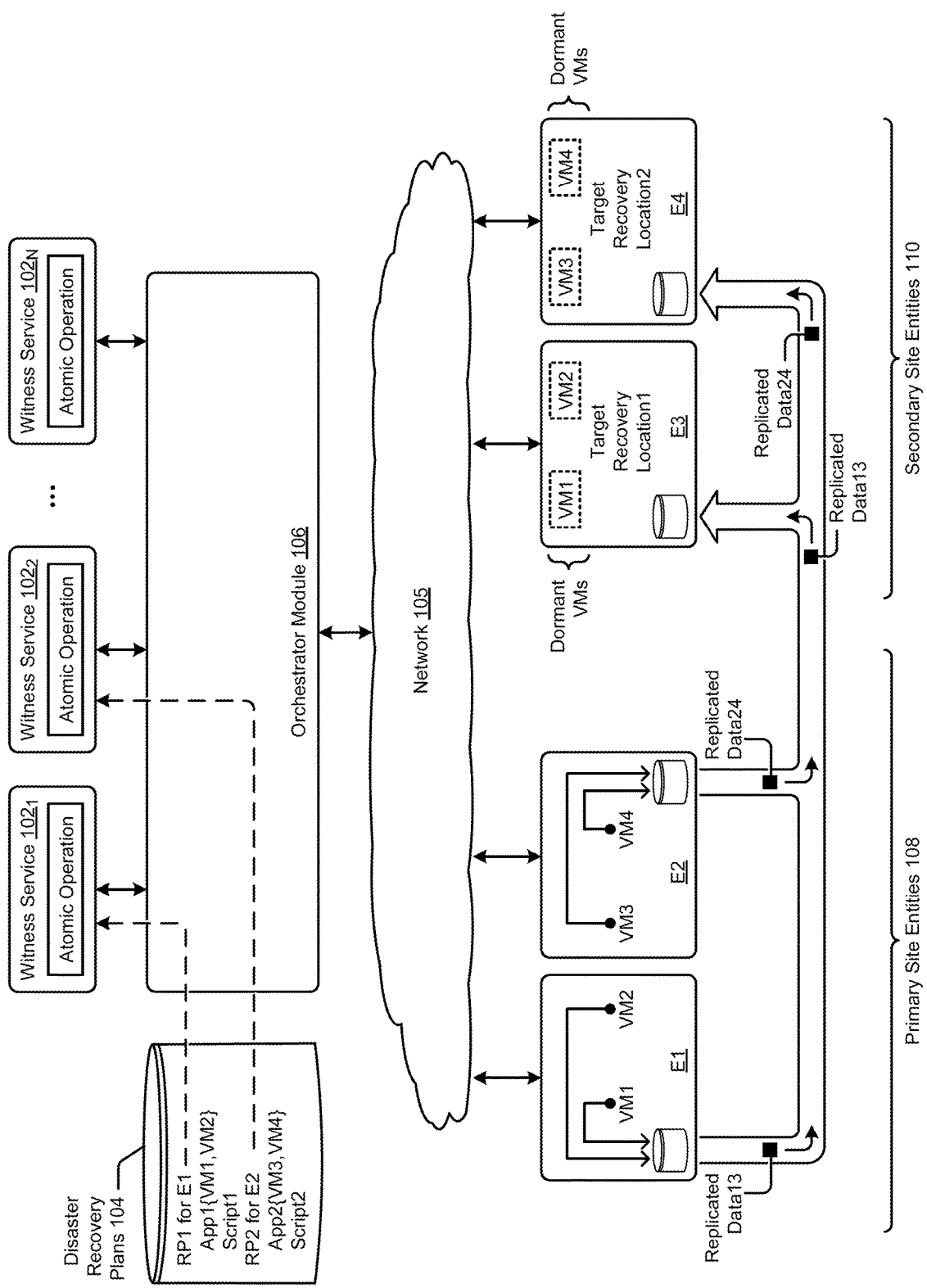
FIG. 1A2

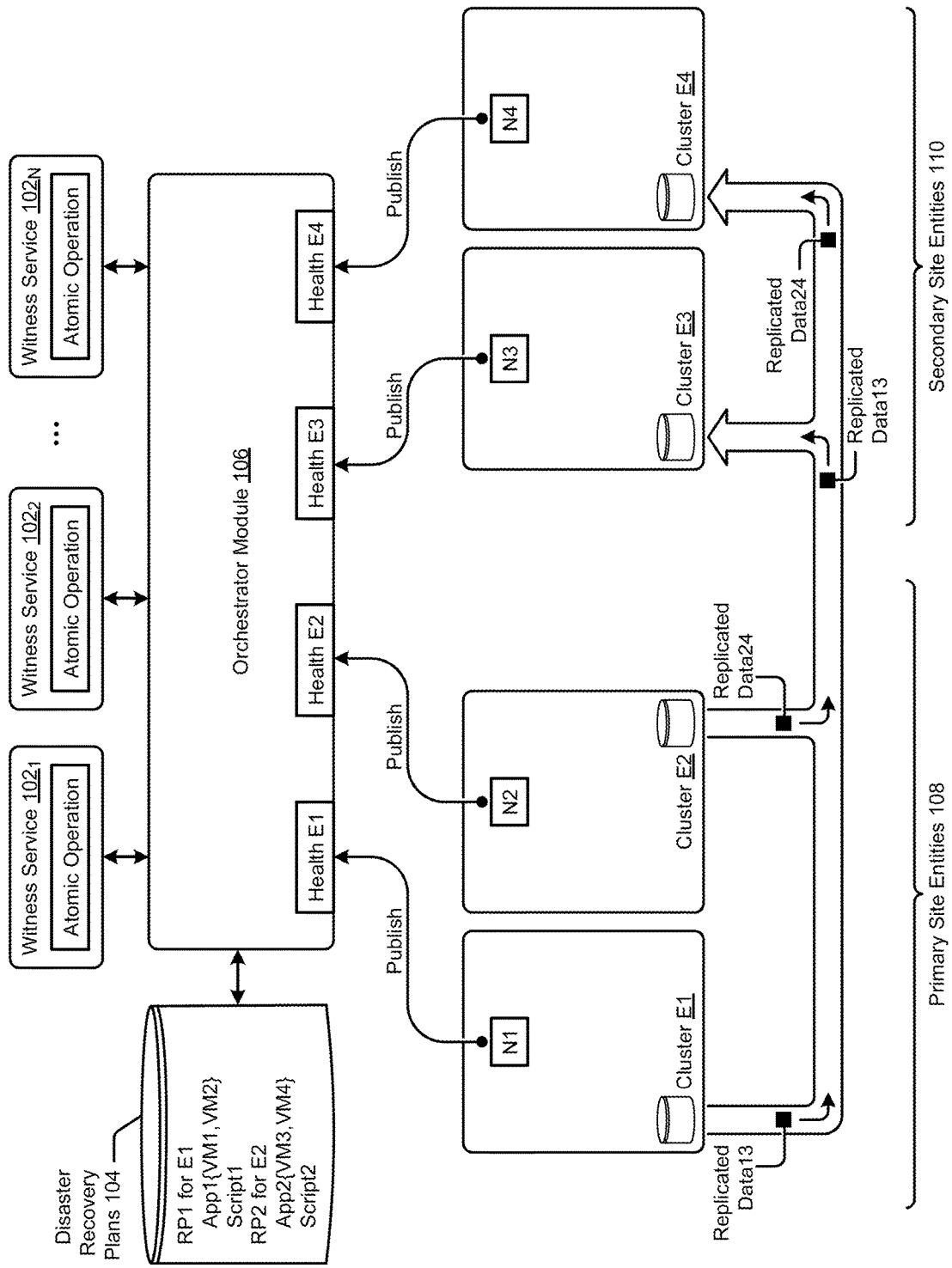
FIG. 1D1

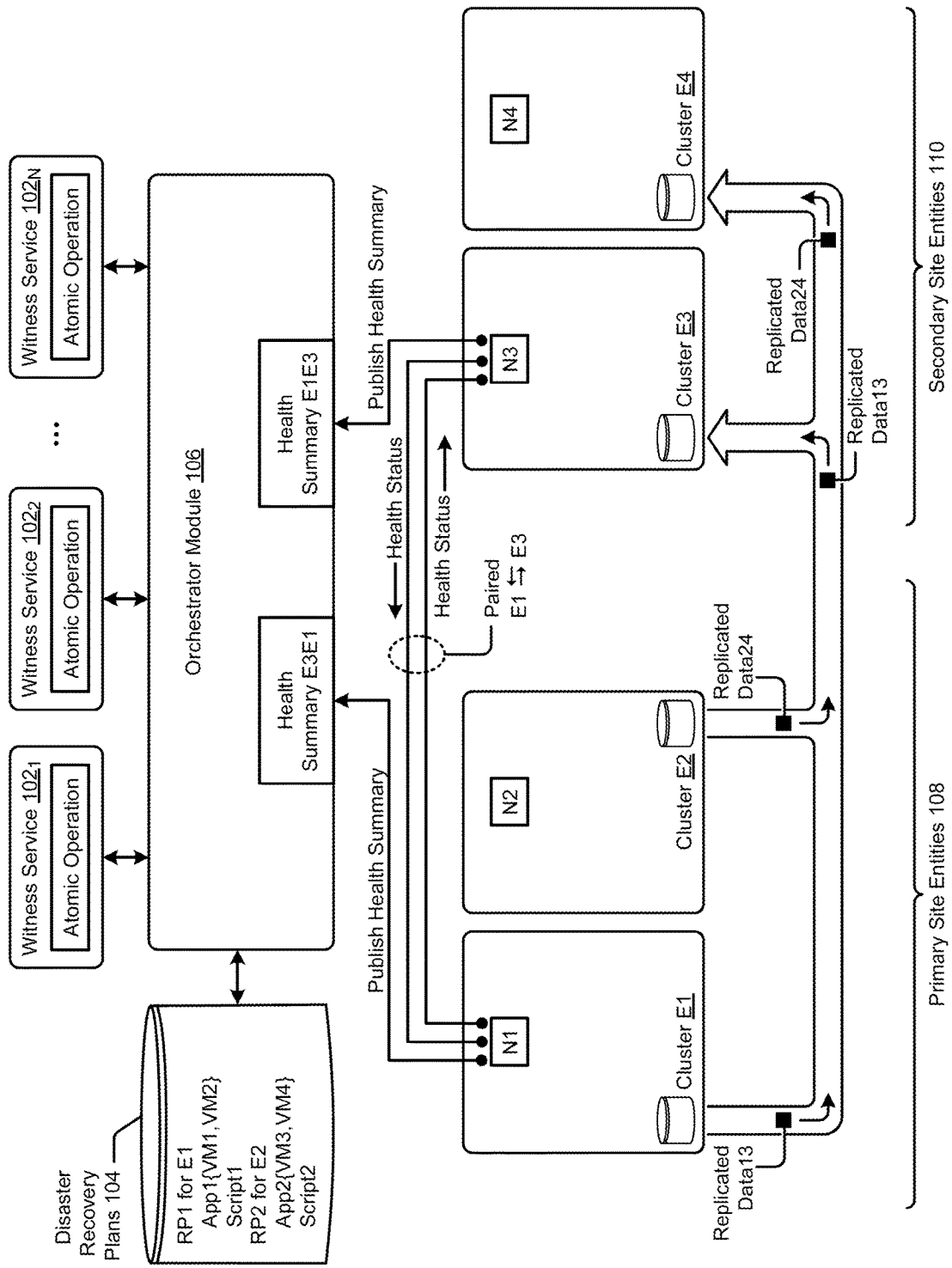
FIG. 1D2

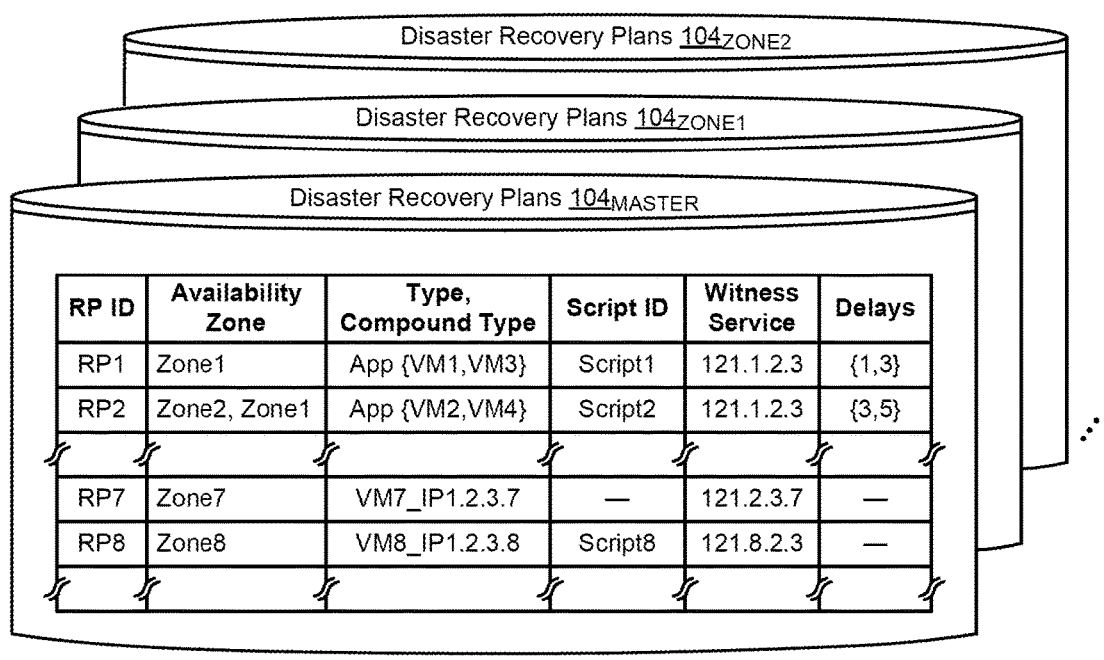
FIG. 2B1

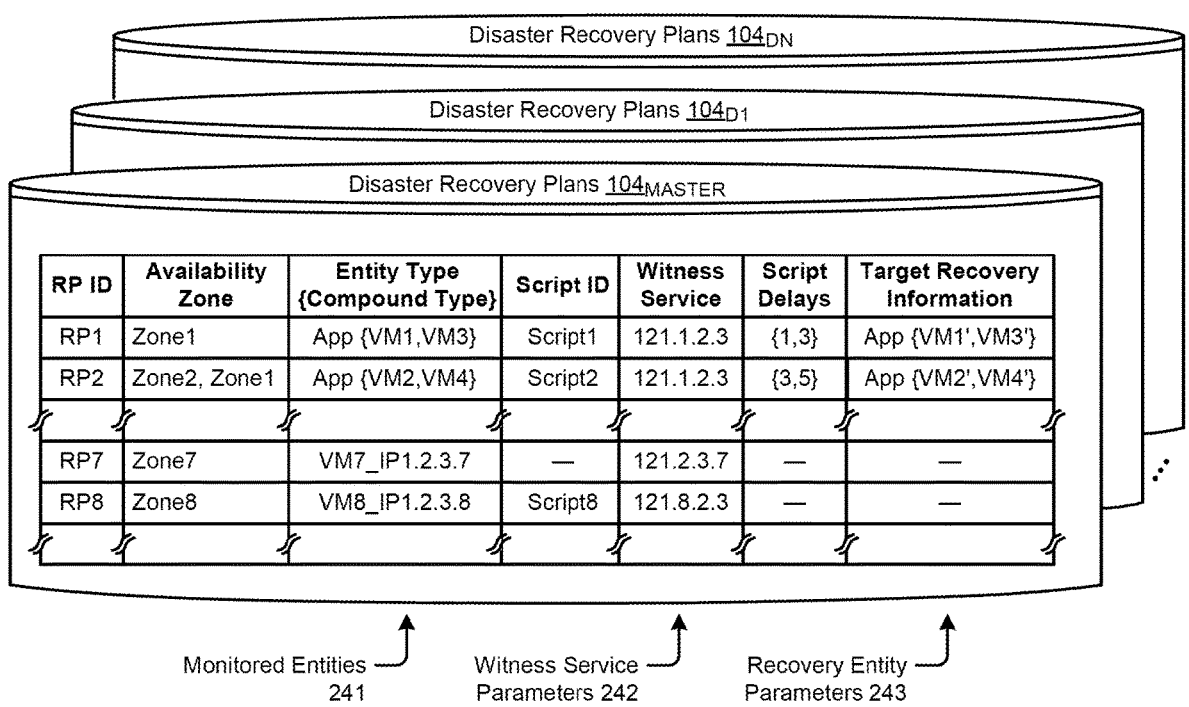
FIG. 2B2

SELECTING A WITNESS SERVICE WHEN IMPLEMENTING A RECOVERY PLAN

RELATED APPLICATIONS

The present application claims the benefit of priority to India Patent Application Ser. No. 202141002109 titled "RECOVERY PLAN PROCESSING WITH A WITNESS FOR DISASTER RECOVERY" filed on Jan. 16, 2021.

TECHNICAL FIELD

This disclosure relates to high availability computing architectures, and more particularly to techniques for selecting a witness service when implementing a recovery plan.

BACKGROUND

Computing systems are configured to perform some desired function. In some cases, a disaster recovery regime is established such that in the event of a disaster event that affects the computing system, the computing system can be recovered at a different location that was not affected by the disaster event, and the different computing system that is established at a different location can continue to perform the desired function. In some computing system deployments, a computing system might be composed of many components that are interrelated to each other to cooperatively perform some desired function. As such, it can happen that failure of even one component of the many components of the system can prevent the system as a whole from accomplishing the desired function.

Unfortunately, such disaster recovery regimes operate on a one-size-fits-all basis where an entire computing system is brought-up in at a different location that was not affected by the disaster event. This one-size-fits-all approach has many deficiencies.

As one example, when comporting to a one-size-fits-all regime, techniques to identify a witness to arbitrate between multiple computing components are often static and inflexible. As another example, when comporting to a one-size-fits-all regime, techniques to identify which computing system component(s) to recover is often static and inflexible.

The foregoing one-size-fits-all approach suffers from limited flexibility especially in the situation where, due to the presence of many interrelated components, there are many ranges and/or combinations of possibilities for recovery.

Unfortunately, there are no known techniques for addressing these many possibilities for recovery. Therefore, what is needed is a technique or techniques that address technical deficiencies of the one-size-fits-all approach.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

In one embodiment, a recovery plan addresses computing entity recovery in a virtualization system where the recovery plan identifies specific witnesses that correspond to respective subsets of entities of the virtualization system. A computing element of the virtualization system responds to a failure event in the virtualization system by triggering recovery of at least one of the subset of entities in the recovery plan. A witness is selected from the recovery plan based on how the failure event affects the subset of entities in the recovery plan. The selected witness is used to elect a leader, and the elected leader initiates actions to implement the recovery plan.

In another embodiment, a recovery plan that addresses relationships between two or more virtualization system components is established and used for fine-grained recovery. As discussed above, a "one size fits all" approach results in unnecessarily expending computing resources in event of a failure event. This unnecessary expenditure of computing resources can be especially wasteful if the failure event had affected only some relatively small portion of the virtualization system as a whole, A better approach is to define recovery plans that interrelate specific subsets of virtualization system components such that recovery can be carried out to recover only those specific virtualization system components that actually need to be recovered in the face of a particular failure event.

As such, and as disclosed herein, various embodiments implement fine-grained recovery plans that specify particular subsets of the virtualization system so that in the circumstance of a failure event, only those certain recovery operations that pertain to those particular subsets of the virtualization system are carried out, rather than carrying out recovery of a much larger set of entities including those entities that were not affected by the failure event and thus would not actually need to be recovered.

Disclosed herein are fine-grained recovery plans define relationships between subsets of virtualization system components. As such, when a failure event is detected in the virtualization system, a computing entity determines which specific virtualization system components are affected by the detected event. Then, based on the determination, fine-grained recovery is initiated wherein the recovery is performed against only the subset of the overall set of components of the virtualization system.

The present disclosure describes techniques used in systems, methods, and in computer program products for disaster recovery plan processing using a user-designated witness for disaster recovery, which techniques advance the relevant technologies to address technological issues with legacy approaches. More specifically, the present disclosure describes techniques used in systems, methods, and in computer program products for disaster recovery plan processing using a user-specified designated witness. Certain embodiments are directed to technological solutions for executing only those particular portions of a disaster recovery plan that pertain to a particular lost entity.

The herein-disclosed embodiments for executing only those particular portions of a disaster recovery plan that pertain a particular lost (e.g., downed, crashed, unreachable) entity involve technological solutions pertaining to technological problems that arise in the hardware and software arts that underlie high availability computing environments. Aspects of the present disclosure achieve performance and other improvements in peripheral technical fields including, but not limited to, high-performance disaster recovery and hyperconverged computing platform management.

Some embodiments include a sequence of instructions that are stored on a non-transitory computer readable medium. Such a sequence of instructions, when stored in memory and executed by one or more processors, causes the one or more processors to perform a set of acts for executing only those particular portions of a disaster recovery plan that pertain to a particular lost entity.

Some embodiments include the aforementioned sequence of instructions that are stored in a memory, which memory is interfaced to one or more processors such that the one or more processors can execute the sequence of instructions to cause the one or more processors to implement acts for determining a witness service to use by accessing a disaster recovery plan that specifies a witness service corresponding to a particular lost entity.

In various embodiments, any combination of any of the above can be combined to perform any variations of acts pertaining to disaster recovery plan processing using a designated witness for disaster recovery, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1A1 shows an environment where witnesses correspond to disaster recovery plans, according to some embodiments.

FIG. 1A2 shows an example of how specific different witnesses correspond to specific different disaster recovery plans, according to some embodiments.

FIG. 1D1 and FIG. 1D2 show various techniques for monitoring the health of computing entities, according to some embodiments.

FIG. 2B1 and FIG. 2B2 show example disaster recovery plan repositories, according to some embodiments.

DETAILED DESCRIPTION

Figure 1B:
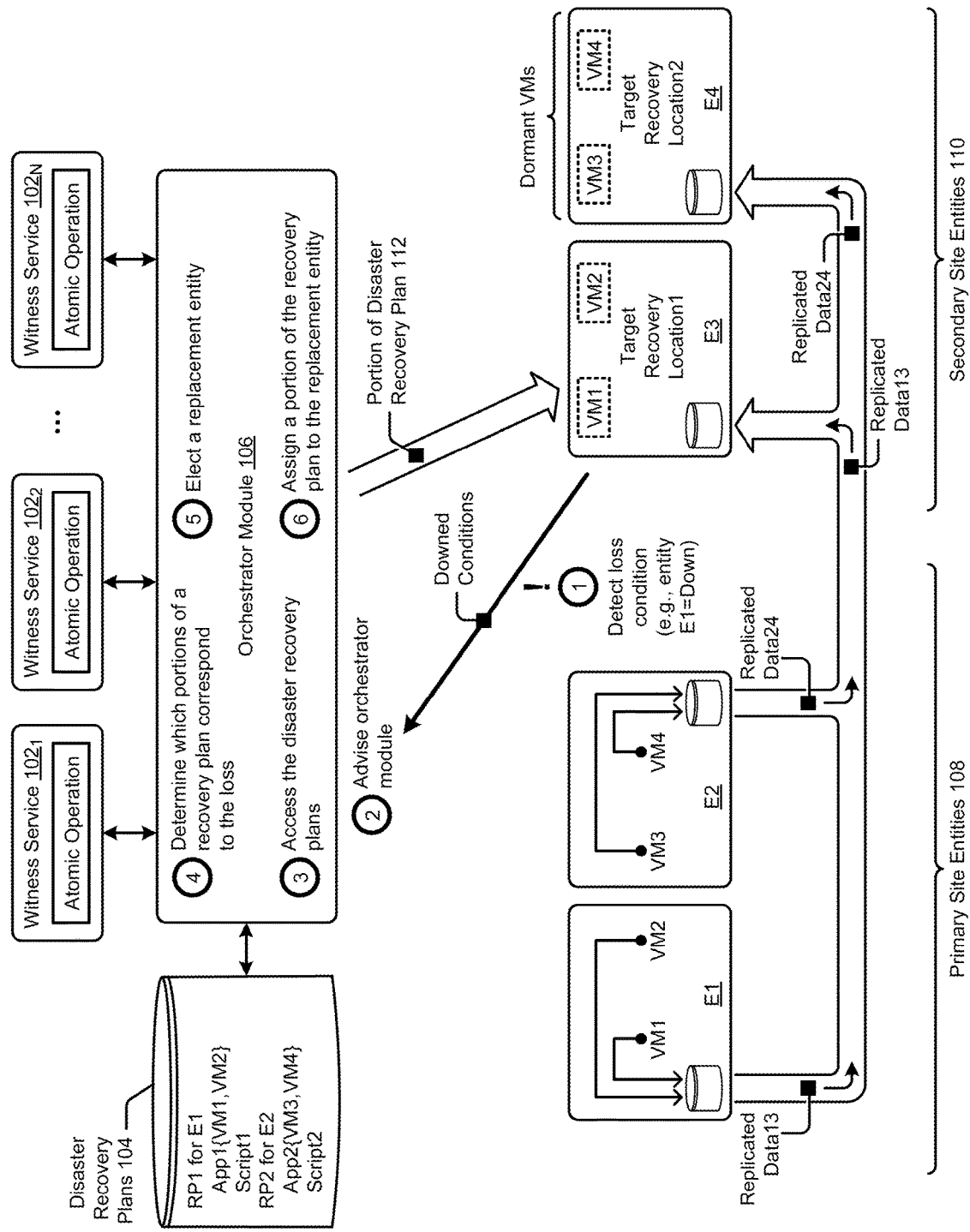
FIG. 1B, and FIG. 1C exemplify environments in which disaster recovery plan processing using an orchestrator module and a user-specified witness service can be carried out, according to some embodiments.

Aspects of the present disclosure solve problems associated with using computer systems for carrying out only selected portions of a disaster recovery plan that pertain to recovering a lost entity. These problems are unique to, and may have been created by, various computer-implemented methods for disaster recovery. Some embodiments are directed to approaches for using a dynamically-selected witness when assigning actions of a disaster recovery plan to a computing entity. The accompanying figures and discussions herein present example environments, systems, methods, and computer program products for disaster recovery plan processing using a designated witness for disaster recovery.

OVERVIEW

Disclosed herein is an improved approach to implement recovery (e.g., disaster recovery) for virtualization systems. One or more recovery plans are created, each of which identify specific steps to be carried out for recovery of virtual machines (VMs) or other computing entities upon the failure of a node or cluster. Such recovery plans specify parameters pertaining to (1) witness service location and usage, (2) failover detection parameters, and (3) timing thresholds, as well as specific actions (e.g., scripts) to be carried out for VM bring-up after a detected failure or outage. An orchestrator module monitors the various clusters pertaining to the recovery plans. Upon detection of a possible failure, the orchestrator module will use a particular witness service to arbitrate for a leader cluster/node according to the terms of any applicable recovery plan. Recovery actions will then be carried out to perform recovery of the virtualization system.

The improved approaches are applicable to heterogeneous environments (e.g., hybrid cloud environments). The specific recovery steps are agnostic to the network/architecture differences between, for example, on-premises environments and public or private cloud-based environments. The recovery plans themselves may include specific information (e.g., IP addresses) that accounts for differences between heterogeneous environments. Alternatively or additionally, an integration layer performs any necessary translations between any two or more different entities/environments. (e.g., differences between on-premises entities/environments versus cloud-based entities/environments). The orchestrator module and the witness services may be located anywhere, whether on-premises or in a particular cloud, or in multiple locations (e.g., geographically-distal locations) as would correspond to high-availability (HA) services.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1 shows an environment where witnesses correspond to disaster recovery plans As an option, one or more variations of environments or any aspect thereof may be implemented in the context of the architecture and functionality of the embodiments described herein. The environments or any aspect thereof may be implemented in any environment.

FIG. 1A1 is being presented to illustrate how an orchestrator module 106 can interact with any one or more of a set of primary site entities 108 (e.g., the shown entities E1 and E2) and any one or more of a set of secondary site entities 110 (e.g., the shown entities E3 and E4) that are configured to interact in disaster recovery scenarios. More specifically, and as shown, entities of the primary site and entities of the secondary site communicate over network 105, which network also serves as a network communication path between the sites, the orchestrator module and any one of a plurality of witness services.

The network can be used for replicating data from the primary site to the secondary site. In fact, and as shown, data that is generated at the primary site (e.g., by virtual machine VM1, virtual machine VM2, virtual machine VM3, and virtual machine VM4) can be replicated at the secondary site. The configuration of the entities at the secondary site includes staging of replicated data (e.g., replicated data13, replicated data24) such that, when bringing up a replacement entity (e.g., virtual machine VM1 at target recovery location1 on entity E3, or virtual machine VM3 at target recovery location2 on entity E4), the data that had been produced at the primary site is available at the secondary site.

The environment of FIG. 1A1 supports many variations. One such variation supports applications that are architected as disaster-resilient client-server applications. Any operational component in the environment can be paired with any other operational element in the environment such that, in the event of an outage or other loss of one of the operational elements, or when conditions are such that when an operational element is no longer able to verify ongoing operations of the other operational element, then the detecting operational element initiates steps to recover from the outage or loss of a member of a pair.

Any known techniques can be used to detect the event of an outage or other loss of any of any of the operational elements. Strictly as examples, a periodic heartbeat mechanism can be implemented at a node level or at the cluster level. As other examples, any operational element (e.g., a virtual machine, an executable container, a middleware component, a process, etc.) can check for a periodic heartbeat and, if the checking operational element does not notice a heartbeat within a particular time period, then an outage or loss condition is deemed to have occurred and the checking operational element can initiate steps to recover from the outage or loss.

Applying the foregoing to the juxtaposition of the entities of FIG. 1A1, it can happen that entity E3 detects a loss of a heartbeat of entity E1. In this case, all virtual machines on E1 (e.g., virtual machine VM1 and virtual machine VM2) would then need to be the subject of recovery operations (e.g., bring-up of virtual machine VM1 on entity E3 and bring-up of virtual machine VM3 on entity E4).

As depicted by the shown disaster recovery plans 104, there may be different sets of recovery plans that specify different sets of recovery actions to be taken. For example, a first recovery plan RP1 can be consulted for recovery actions pertaining to VM1, and a second recovery plan RP2 can be consulted for recovery actions pertaining to VM2.

In some embodiments, recovery plans are codified as a collection of logic and/or parameters that cause determination of a single recovery leader from among two or more choices, such that the single recovery leader initiates a particular series of recovery operations based on a loss event pertaining to a loss of function of a particular one or more components of a virtualization system. Any individual recovery plan can work in combination with data replication facilities. Specifically, determination of what component or components of a virtualization system are to be recovered may be informed by ongoing data replication for the component or components. As one example, if a particular first VM on a first node has suffered a failure, and if the data of the first VM had been being replicated at a second node, then the second node would be a candidate recovery location for recovery of the failed first VM. As used herein a loss event or disaster event or failure event refers to a loss of communication or a decrease of health, or a loss of function or other degradation of liveness of a virtualization system component. As such, a loss event or disaster event or failure event may be temporary (e.g., a temporary loss of communication or a temporary loss of function).

One way for a particular operational element to verify the liveness of ongoing operations of another operational element is to pair operational elements. In this case, both of the paired operational elements periodically issue a "heartbeat signal". If a time period expires without detecting an "I'm alive" heartbeat signal from a paired operational element, then the surviving operational element can initiate actions to remediate the loss. In one scenario, the surviving operational element can invoke processing at the orchestrator module.

The foregoing pairs of operational elements can correspond to any boundary or boundaries and any of the different types of the foregoing entities. Moreover, any type of operational element can be paired with any other type of operational element. Strictly as examples, a member of a pair can correspond to a node, or can correspond to a rack of nodes, or can correspond to a cluster, or can correspond to even higher-level entities such as a data center, etc.

Consider the scenario when entity E3 (e.g., a computing cluster) is running and determines that the heartbeat from entity E1 (e.g., a different computing cluster) is lost. In this scenario, entity E3 will notify the orchestrator module 106 of the detected loss of entity E1. The orchestrator module will in turn initiate disaster recovery plan processing to remediate from the reported loss of E1.

Continuing this example, and specifically the example of remediation when an outage has been reported, the orchestrator module would determine which of a plurality of possible witness services should be used, after which determination, the orchestrator module will invoke the particular determined witness service to elect a leader for carrying out recovery and/or other remediation actions. Even though, such as in the foregoing example, entity E3 deems that entity E1 is down, it can sometime happen that entity E1 is not actually down, but rather it is merely that entity E3 sees E1 to be unreachable (e.g., due to a network outage that is local to entity E3). In such cases, the determination by E3 that entity E1 is down might be false or transient (i.e., meaning that actually neither entity E1 nor entity E3 are down), thus leading to the need for a witness service to elect one leader to carry out recovery and/or other remediation activities. As such, the orchestrator module will invoke a particular user-specified one of the multiple available witness services to elect a leader between the detecting entity (i.e., entity E3) and its paired entity (i.e., entity E1).

There are many scenarios that arise on the basis of the particular outage and/or on the basis of which entity or entities are deemed to be downed or unreachable and/or on the basis of how two or more entities are paired. For example, in some deployments synchronous data replication is carried out between an active entity and its paired standby entity. In other deployments asynchronous data replication is carried out between an active entity and its paired standby entity. Accordingly, when implementing a recovery plan, the orchestrator module and/or its agents are configured to assess if paired entities are to be reconfigured into (1) a synchronous replication mode, or (2) into an asynchronous replication mode. When implementing a recovery plan, the orchestrator module or its agents can be configured to wait for a predetermined amount of time so as to allow the recovered entity or entities to re-establish their assigned replication mode. In the case that paired entities had been configured for synchronous replication, the orchestrator can make a decision to bring up replacement entities immediately upon leadership election since even if the active entity is still operational, writes to the standby entity will not make forward progress.

It should be emphasized that there are many reasons why a particular witness service might be selected in a remediation scenario. Strictly as examples, a deployer of a computing system (e.g., a computing cluster, a data center, a remote-office/branch-office configuration, etc.) might have policy reasons, trust reasons or commercial reasons why a particular witness service is preferred over another witness service. In some situations, a deployer of a computing system (e.g., a computing cluster, a data center, a remote-office/branch-office configuration, etc.) might have a priori knowledge of how different witness services that are located in different geographic regions are expected to perform (e.g., with respect to reachability and/or latencies), and as such a deployer might choose one witness service over another.

Irrespective of the reasons why a particular witness service is preferred over another witness service, in the event of remediation after a detected failure event, the preferred witness service is used to establish a leader for carrying out remediation and recovery steps. Once a single leader (e.g., a surviving member of a pair) has been established (e.g., via operation of the witness service) then the leader consults the disaster recovery plans 104 to consider possible remediation actions. As shown, the disaster recovery plans (e.g., disaster recovery plan RP1, disaster recovery plan RP2) characterize relationships between higher level entities and constituent, hierarchically lower level entities. In the specific example of FIG. 1A1, disaster recovery plan RP1 characterizes the higher level entity "App1" as comprising hierarchically lower level computing entities (e.g., virtual machine VM1 and virtual machine VM2). As such, if all of the constituent, hierarchically lower level entities are healthy, then the higher level entity "App1" is deemed to be healthy.

The determination of what components of a recovery plan are to be considered in a recovery can range from the highest level of the hierarchy down to the lowest level of the hierarchy. For example, if a hierarchically lower-level entity is deemed to have failed, then just that hierarchically lower-level entity can be considered for recovery. As a different example, if a hierarchically lower-level entity is deemed to have failed, then just that hierarchically lower-level entity as well as its hierarchically-higher entities can be considered for recovery. In some cases, an entire node, together with its constituent lower-level entities are recovered. In some cases, an entire cluster, together with its constituent lower-level entities are recovered.

In alternative embodiments, a member of a pair can correspond to a boundary of a lower-level entity such as a hypervisor or a process or a virtual machine. In situations that arise in these alternative embodiments, a single virtual machine (e.g., virtual machine VM1) can be the subject of recovery actions. As shown, portions of disaster recovery plan RP1 correspond to bring-up of a replacement for virtual machine VM1. Once virtual machine VM1 has been replaced, then the hierarchically higher level entity "App1" of disaster recovery plan RP1 is deemed to be again operational and a recovery script (e.g., Script1) can be run.

It can sometimes happen that there are multiple entities that are able to participate in the recovery actions. Strictly for illustration, and continuing the example of FIG. 1A1, it can be seen that a replacement virtual machine VM1 could potentially be situated on one of two different nodes (e.g., entity E3 or entity E1) since both nodes (e.g., both entity E3 and entity E1) have local storage of replicated data13. This sets up the situation where only one of the two different nodes needs to be elected as a leader for initiating and/or carrying out recovery remediation steps. More specifically, although orchestrator module 106 might have the option of choosing one of the two nodes (e.g., entity E3 or entity E1), some mechanism (e.g., an atomic operation of a witness service) needs to ensure that only one of the two nodes actually becomes deemed to be the leader for initiating and/or carrying out specific recovery steps corresponding to a specific remediation plan. One way to accomplish this is for the orchestrator module to consult a witness service that is selected based on invocation of a particular recovery plan.

FIG. 1A2 shows an example of how different witnesses correspond to different disaster recovery plans. As shown by the broken line arrows, a first witness (e.g., witness service $102_1$) corresponds to a first recovery plan, whereas a second witness (e.g., witness service $102_2$), and whereas an Nth witness (e.g., witness service $102_N$) corresponds to an Nth first recovery plan. When a particular disaster plan is invoked, a corresponding witness is selected.

As such, and unlike prior approaches where a witness is merely a static parameter in a file that refers to a witness facility to be invoked in event of a failure, the presently-discussed embodiments associate different witnesses with different recovery plans. Moreover, whereas in legacy implementations where recovery of a system is handled at a coarse grained level (e.g., recovery of a lost node), the presently-discussed embodiments implement structured recovery plans that are configured to support fine-grained recovery (e.g., recovery of a lost virtual machine or combination of virtual machines). Still further, the presently-discussed embodiments implement a real-time determination (e.g., determination at the time of a detected failure event) of what specific recovery plan or plans are applicable to a particular failure event. Specifically, the presently-discussed embodiments implement a real-time determination, based on which particular computing elements are deemed to have suffered a loss of functionality, of what computing element or combination of computing elements are to be subject to recovery operations. Still more specifically, the presently-discussed embodiments specify which particular witness (e.g., one of the witness services selected from witness service $102_1$, witness service $102_2$, . . . , witness service $102_N$) is to be selected for electing a leader to carry out recovery operations of a corresponding recovery plan.

As shown, a recovery plan may be codified to include relationships between two or more virtualization system components. The relationships can be defined at a fine-grained level where one or more subsets of components of the virtualization system are related to one or more other subsets of other subsets of components virtualization system components that comprise an overall set of virtualization system components. For example, a first subset of components (e.g., two or more VMs) can be codified as being related (e.g., hierarchically-related) to a second subset of components (e.g., related to an application and/or related to a host entity).

Upon occurrence of a failure event or loss of health or loss of function of a component in the virtualization system, a recovery plan that references the lost component is accessed. Then, based at least in part on the accessed recovery plan, the specific one or ones of the virtualization system components are affected by the event are identified. A recovery can be carried-out at a fine-grained level. Specifically, at least some actions of recovery are performed against only certain of the specific subset of virtualization system components that are affected by the identified event. This is because a fine-grained recovery plan specifies subsets (e.g., hierarchically-interrelated subsets) of the overall set of components of the recovery plan. In some embodiments, a different witness is specified for each hierarchically-interrelated subset of the recovery plan. Moreover, a different witness can be determined for each hierarchically-interrelated subset of the recovery plan based on aspects of the failure event.

The particular selected witness can serve as an arbiter between two or more computing entities that are candidates for taking on the leadership role (e.g., for initiating and/or carrying out recovery remediation steps). In some embodiments, the witness services each have an atomic compare and swap (CAS) facility such that exactly one of many candidates becomes designated as the leader, and all other candidates are not the leader.

In some situations, a particular selected witness service might be able to communicate with two or more entities from which exactly one of the two or more entities is to be designated as the leader. In such a case, the determined leader takes on the leader role, and the others of the two or more entities either end their processing or take on a follower role. As such, exactly one leader is elected by the particular selected witness service, this avoiding situations where two or more computing entities compete for the same resources. The entity or entities that do not take on the leader role can be marked as inactive (e.g., its execution state is set to inactive) or destroyed. Additionally, or alternatively, actions taken (e.g., replication actions, messaging out or responding to incoming messaging, provision of outputs to a caller, etc.) by the entity or entities that do not take on the leader role can be stopped or ignored in favor of actions taken by the entity that does take on the leader role.

In some embodiments, the orchestrator module is configured to receive an indication of a loss of a computing entity. Such an indication can be raised by any computing entity in the environment. In example embodiments, the indication of a lost entity includes an identification of the particular entity that is deemed to have been lost. Accordingly, the orchestrator module can access a recovery plan repository (e.g., the shown disaster recovery plans 104) that comprise a recovery plan entry referring to the computing entity and/or its hierarchically-lower entities that have been deemed to have been lost. Strictly as an example, consider the case that entity E1 is deemed to have been lost. In this example, the orchestrator module scans through the recovery plan entries to identify any recovery plan entries that refer to lost entity E1. There is such an entry (e.g., the entry beginning with "RP1 for E1") and, as such, the orchestrator can know that at least a portion of the hierarchically-lower entity "App1" is hosted on entity E1, specifically VM1. The orchestrator can then identify candidate replacement computing entities that are configured to at least potentially serve as a replacement for the computing entity corresponding to the loss. In this example, the lost entity is E1, and E1 hosts App1, which in turn is composed of VM1 and VM2. Since entity E3 has been hosting dormant copies of VM1 and VM2, and since entity E3 has been a secondary (e.g., replication) site for entity E1, then entity E3 is a good candidate to serve as a replacement for App1. Of course there may be other computing entities that had been hosted on the downed E1, and those other computing entities can be recovered using a corresponding recovery plan.

The foregoing can be described as a series of operations that can be carried out in a sequence to implement disaster recovery plan processing at the granularity of applications and/or virtual machines. One such series of operations is shown and described as pertains to FIG. 1B.

FIG. 1B depicts a series of operations that begin when entity E3 detects a loss condition. This is shown as operation 1 where entity E3 notices downed conditions, for example, a loss of heartbeat from entity E1. Noticing a loss of heartbeat by one computing entity of a pair of computing entities can be accomplished using any known technique. In the example shown, ongoing heartbeat detection is carried out by periodic interrogation by both of the paired entities to its corresponding pair. When respective ones of the foregoing paired entities are situated in different fault domains (e.g., entity E1 being situated in a first fault domain and entity E3 being situated in a second fault domain), then entity E1 can detect a loss of entity E3 and entity E3 can detect a loss of entity E1.

Assuming, strictly for illustrative purposes, that entity E3 detects a loss of entity E1 (operation 1), then entity E3 can advise the orchestrator module of the detected loss of entity E1 (operation 2). The orchestrator module will, in turn, access the disaster recovery plans (operation 3) and, by processing the disaster recovery plans, the orchestrator module can determine which portion or portions of the disaster recovery plan is/are to be carried out (operation 4). The orchestrator module may then cause any number of candidate entities to vie for a leadership role (e.g., using a determined one of witness service $102_1$, witness service $102_2$, . . . , witness service $102_N$) for initiating and/or carrying out further recovery remediation steps. Once one of the candidate entities has been designated to take on the leadership role for initiating and/or carrying out recovery remediation steps, that designated leader entity can be deemed to be the host of the replacement (operation 5) for the lost entity.

The orchestrator module can assign a portion of the disaster recovery plan 112 (operation 6) to the leader entity that had been deemed to be the host of the replacement for the lost entity. Furthermore, the orchestrator module can send the specific portion of the disaster recovery plan (e.g., the portion of the disaster recovery plan determined in operation 4) to the host of the replacement for the lost entity. In this example, the virtual machine VM1 shown at target recovery location1 is brought-up on entity E3. It should be noted that entity E3 had been the replication data target for data originating from virtual machine VM1 while it was operational on entity E1 and, as such, the replication data13 that is located at entity E3 is substantially the same as the replication data13 that had been originated by virtual machine VM1 while it was operational at entity E1.

There can be many definitions of a fault domain. For example, a fault domain can comprise a series of nodes that are powered by a common power supply, or a fault domain can comprise a single computing node, or a fault domain can comprise a hypervisor, or a fault domain can comprise an application, or a fault domain can comprise a virtual machine, etc. In some cases, different fault domains can arise in different computing clouds. One example where different fault domains arise in different computing clouds is shown and described as pertains to FIG. 1C.

Figure 1C:
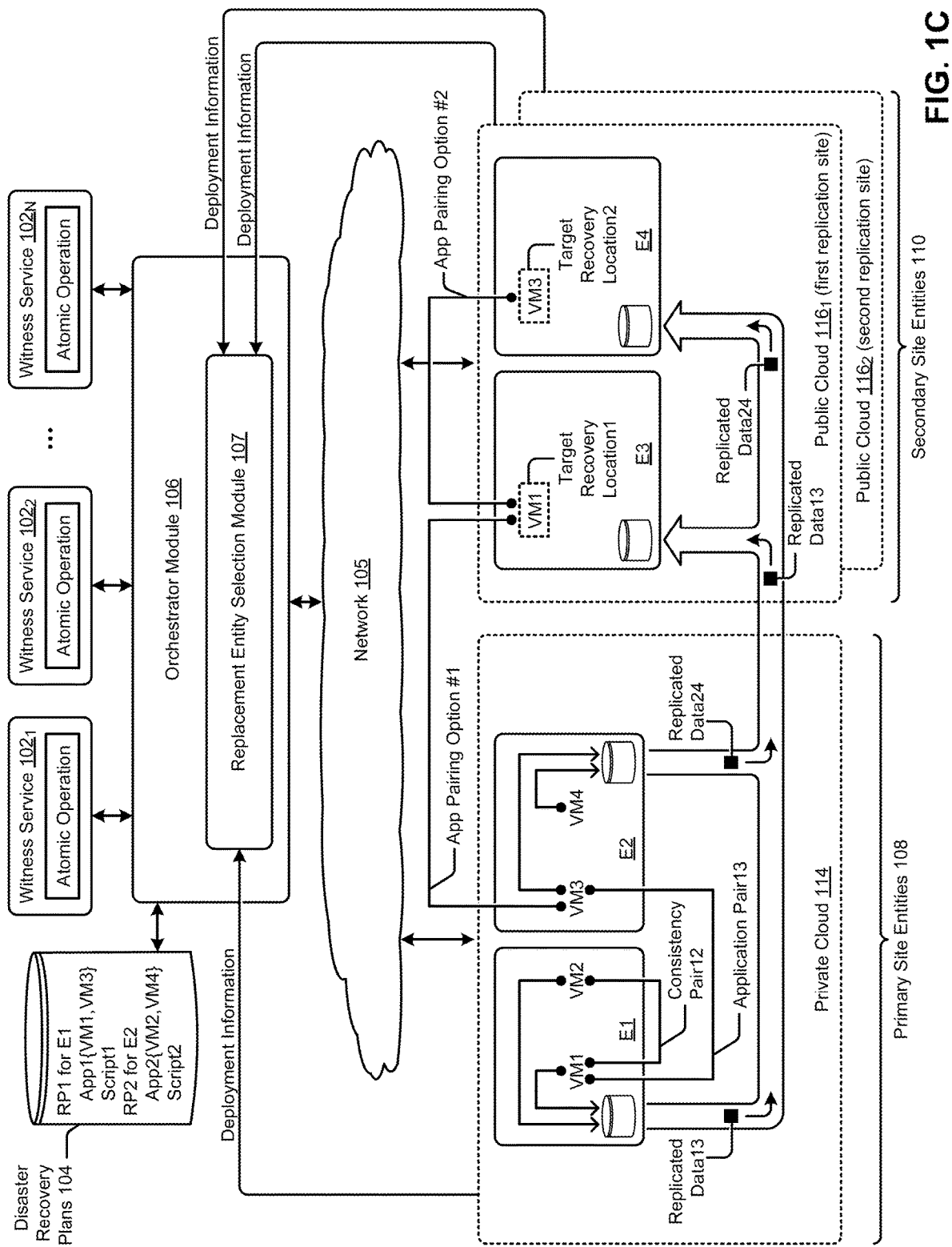

To illustrate, FIG. 1C depicts private cloud 114 that constitutes the shown primary site entities 108, whereas public cloud $116_1$ and public cloud $116_2$ constitute the shown secondary site entities 110. In this example, where different fault domains correspond to different computing cloud domains, the orchestrator module has many recovery options to consider when identifying candidate replacement computing entities that are candidates to serve as replacements for computing entities that have suffered a loss.

A loss can be initially detected by any member of a pair. In the specific example of FIG. 1C, pairs can be defined at the application level (e.g., as shown by application pair13) and/or at the data consistency level (e.g., as shown by consistency pair12). Additionally, and in particular, as found in scenarios where replication is enabled between replication sites, VM restoration can be predesignated based on the relationship between a primary site and a secondary site. More specifically, and as shown in this FIG. 1C, since App1 is composed of VM1 and VM3, then any pairing between VM1 and VM3 is at least a candidate for restoration of App1.

Continuing the foregoing example of FIG. 1C, consider a case of replication factor (RF) is RF=2. In such scenario where the replication factor is 2 (e.g., such as is shown by the two public cloud instances), entity E1 is hosted in private cloud 114 and the two replication sites that correspond to the first replication and the second replication are hosted in public cloud $116_1$ and public cloud $116_2$, respectively. Further consider that entity E3 in public cloud $116_1$ detects a loss of entity E1. It might also happen, substantially contemporaneously, that the loss of entity E1 is also detected from within public cloud $116_2$. The orchestrator module 106, upon receipt of an indication of the loss of E1 as received from one or both of public cloud $116_1$ and public cloud $116_2$ will, in turn, access the disaster recovery plans 104 and, by processing the disaster recovery plans, the orchestrator module can determine which portion or portions of the disaster recovery plan is/are to be carried out and/or how the determined portion or portions of the disaster recovery plan is/are to be carried out.

In this case, the orchestrator module can invoke an instance of the shown replacement entity selection module 107. The replacement entity selection module 107 is, in turn, able to facilitate selection candidate replacement entities. In this scenario, either public cloud $116_1$ (i.e., the first replication site) or public cloud $116_2$, (i.e., the second replication site) could serve as a replacement to recover from the loss of E1. Making a determination as to which, from a choice of two or more candidate replacement computing entities (e.g., public cloud $116_1$ or public cloud $116_2$), should be selected can be based at least in part on characteristics that derive from the particular deployments.

More specifically, it might happen that one candidate replacement computing entity is geographically closer to the lost entity, and as such might be a better choice than choosing a different candidate replacement computing entity that is geographically more distant from the lost entity. The foregoing is merely one example, and making a determination as to which one, from a choice of two or more candidate replacement computing entities, can be based on tenant subscription models, loading, extent of elasticity, subscription limits, restrictions and/or costs, service level agreements (SLAs), etc. In some cases, two or more candidates might be deemed to be equally qualified as for becoming a replacement entity (e.g., the two more candidates have a tie score). In such cases, the witness service can be employed to make the final determination as to which one, from among two or more candidate replacements, is selected to be the leader. The orchestrator can cause any number of candidate replacement entities to vie for the leadership role. Once one of the candidate entities has been designated to take on the leadership role for initiating and/or carrying out recovery remediation steps, that designated leader entity can be deemed to be the replacement entity for the lost entity.

To facilitate the foregoing determinations, the replacement entity selection module 107 may ingest deployment information from any/all of either or both of the primary site entities and the secondary site entities. More specifically, the replacement entity selection module 107 can continually receive deployment information from any/all of either or both of the primary site entities and the secondary site entities. This supports additional use cases. For example, in one possible scenario, entity E2 (e.g., a node of a cluster within private cloud 114) might be a candidate replacement entity in the event that entity E1 (e.g., a different node of the same cluster within private cloud 114) goes down. However, based on the deployment information received at the replacement entity selection module, it might be deemed that entity E2 would be oversubscribed if it were tasked to be a replacement for downed entity E1. In this specific situation, the replacement entity selection module might choose to host a replacement for downed entity E1 at either public cloud $116_1$ or public cloud $116_2$.

In environments such as heretofore discussed, various ones of the entities can be situated in different fault domains.

Strictly as an example, public cloud $116_1$ might be deemed to be in a first fault domain, while public cloud $116_2$ might be deemed to be in a second fault domain. Furthermore, any (or all) of the witness services (e.g., witness service $102_1$, witness service $102_2$, . . . , witness service $102_N$) can be situated in respective different fault domains other than the fault domain that correspond to the primary site entities 108 and the fault domain that corresponds to the secondary site entities 110. As such, the witness service is isolated from disaster events that might affect the primary site entities 108 and secondary site entities 110. In some embodiments, in addition to specification of a first (e.g., preferred) witness service, a second (e.g., backup) witness service can be specified.

As discussed above, there are many techniques for identifying candidate replacement computing entities. Such replacement candidates and/or an eventual resolution to one from among multiple replacement candidates can be based on subscription models, costs, SLAs and other private and/or public cloud-related considerations. An example user interface that facilitates user-specification of preferred recovery techniques is shown and described as pertains to FIG. 4. Identification of candidate replacement computing entities can be based on, or comport with, a user-preferred recovery technique, some of which techniques consider the then-current health status of any candidate replacement entity at any target location. Example architectures for maintaining ongoing and continually-maintained health statuses of target locations are shown and described as pertains to FIG. 1D1 and FIG. 1D2.

FIG. 1D1 and FIG. 1D2 show various techniques for monitoring the health of computing entities. FIG. 1D1 illustrates how designated nodes (e.g., node N1 of cluster E1, node N2 of cluster E2, node N3 of cluster E3, and node N4 of cluster E4) publish their health status to the orchestrator module 106. As shown, node N1 of cluster entity E1 reports its self-assessed health to the orchestrator module as health E1, node N2 of cluster entity E2 reports its self-assessed health to the orchestrator module as health E2, node N3 of cluster entity E3 reports its self-assessed health to the orchestrator module as health E3, and node N4 of cluster entity E4 reports its self-assessed health to the orchestrator module as health E4. As such, the orchestrator module can at any time access the health status of any reporting entity.

The foregoing technique serves many uses cases. However some situations involve pairs of entities and, as such, the orchestrator module might need to assess the health of the pair. Strictly as one example, although any node of any cluster can self-assess its health, its self-assessment might not include assessment of network connectivity. Moreover, in many scenarios, the health of a facility as a whole might be based on network connectivity between two entities. Consider a backup and recovery scenario, where cluster entity E3 serves as a replication site for cluster entity E1. It might be useful for the orchestrator module to be able to establish the health of E1 and E3 when they operate as a pair. This scenario is shown and discussed as pertains to FIG. 1D2.

FIG. 1D2 depicts one example pairing of two clusters (e.g., cluster entity E1 and cluster entity E3) that are configured together for each cluster to monitor the health of each other. More specifically, the two paired clusters are configured together such that each cluster monitors the health status of its pair. On an ongoing basis, the health status received from one of the pair is analyzed by the other of the pair and a health summary is published to the orchestrator module. In the shown example, node N1 receives health status information from node N3, processes it to determine a health summary of E3 as summarized by E1, and publishes the health summary as the shown health summary E3E1. The other entity of the pair also performs a health summarization. As shown, node N3 receives health status information from node N1, processes it to determine a health summary of E1 as summarized by E3, and publishes the health summary as the shown health summary E1E3. The foregoing summaries are used by the orchestrator module when determining a replacement entity. The foregoing health summaries may include information pertaining to the speeds and/or latencies of network components between paired entities. As such, information of the health summaries can be used to determine a particular replacement choice as selected from among several candidate replacement choices. This can be important when a replacement action includes replacement of a downed application that relies on, for example, a high download speed, but only relies on a moderate or low upload speed.

Figure 1E:
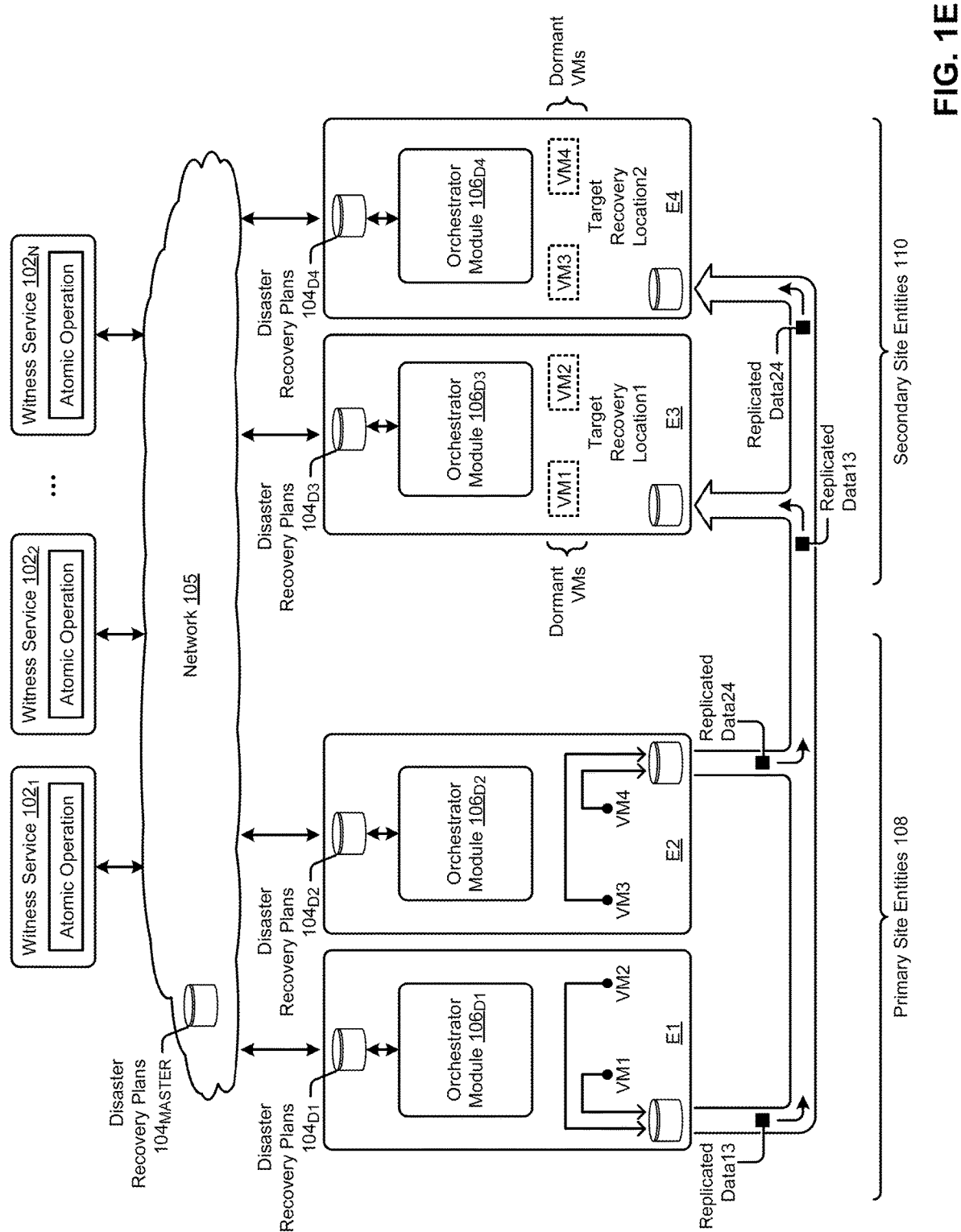
FIG. 1E exemplifies an alternative environment in which disaster recovery plan processing using distributed orchestrator modules and a user-specified witness service can be carried out, according to some embodiments.

FIG. 1E exemplifies an alternative environment in which disaster recovery plan processing using distributed orchestrator modules and a user-specified witness service can be carried out. In this embodiment, rather than implementation of a centralized orchestrator module such as depicted in the foregoing FIG. 1A, FIG. 1A2, FIG. 1B, FIG. 1C, FIG. 1D1 and FIG. 1D2, several orchestrator modules are deployed as operational elements in different entities (e.g., on a node of cluster entity E1, on a node of cluster entity E2, on a node of cluster entity E3, on a node of cluster entity E4, as shown). In this distributed architecture, the several distributed instances of an orchestrator module (e.g., orchestrator module $106_{D1}$, orchestrator module $106_{D2}$, orchestrator module $106_{D3}$, orchestrator module $106_{D4}$) are configured to each access a locally situated copy of the disaster recovery plans $104_{MASTER}$ (e.g., disaster recovery plans $104_{D1}$, disaster recovery plans $104_{D2}$, disaster recovery plans $104_{D3}$, disaster recovery plans $104_{D4}$). In such a distributed architecture, there is no single point of failure for the orchestrator that would prevent carrying out of the recovery plans or portion thereof. Various techniques can be used to synchronize between the master copy of the disaster recovery plans (e.g., disaster recovery plans $104_{MASTER}$) and a locally situated copy of the disaster recovery plans $104_{MASTER}$ (e.g., disaster recovery plans $104_{D1}$, disaster recovery plans $104_{D2}$, disaster recovery plans $104_{D3}$, disaster recovery plans $104_{D4}$).

In a distributed architecture such as is exemplified in FIG. 1E, each of the distributed instances of the orchestrator module are aware of the others of the distributed instances of the orchestrator module. As such, each one of the distributed instances of the orchestrator module can carry out orchestrator actions in conjunction with any one or more of the other ones of the distributed instances of the orchestrator modules. More specifically, any one of the distributed instances of the orchestrator module can initiate an orchestrator protocol that causes orchestration actions to be carried out by any one or more of the other ones of the distributed instances of the orchestrator modules. Such orchestration actions include responding to a downed entity event. More specifically, responding to a downed entity event can include identifying a disaster recovery plan that refers to a downed entity, determining a location for a replacement entity, and assigning bring-up of the replacement entity to a leader node. One possible processing flow for disaster preparedness and response is shown and described as pertains to FIG. 2A.

Figure 2A:
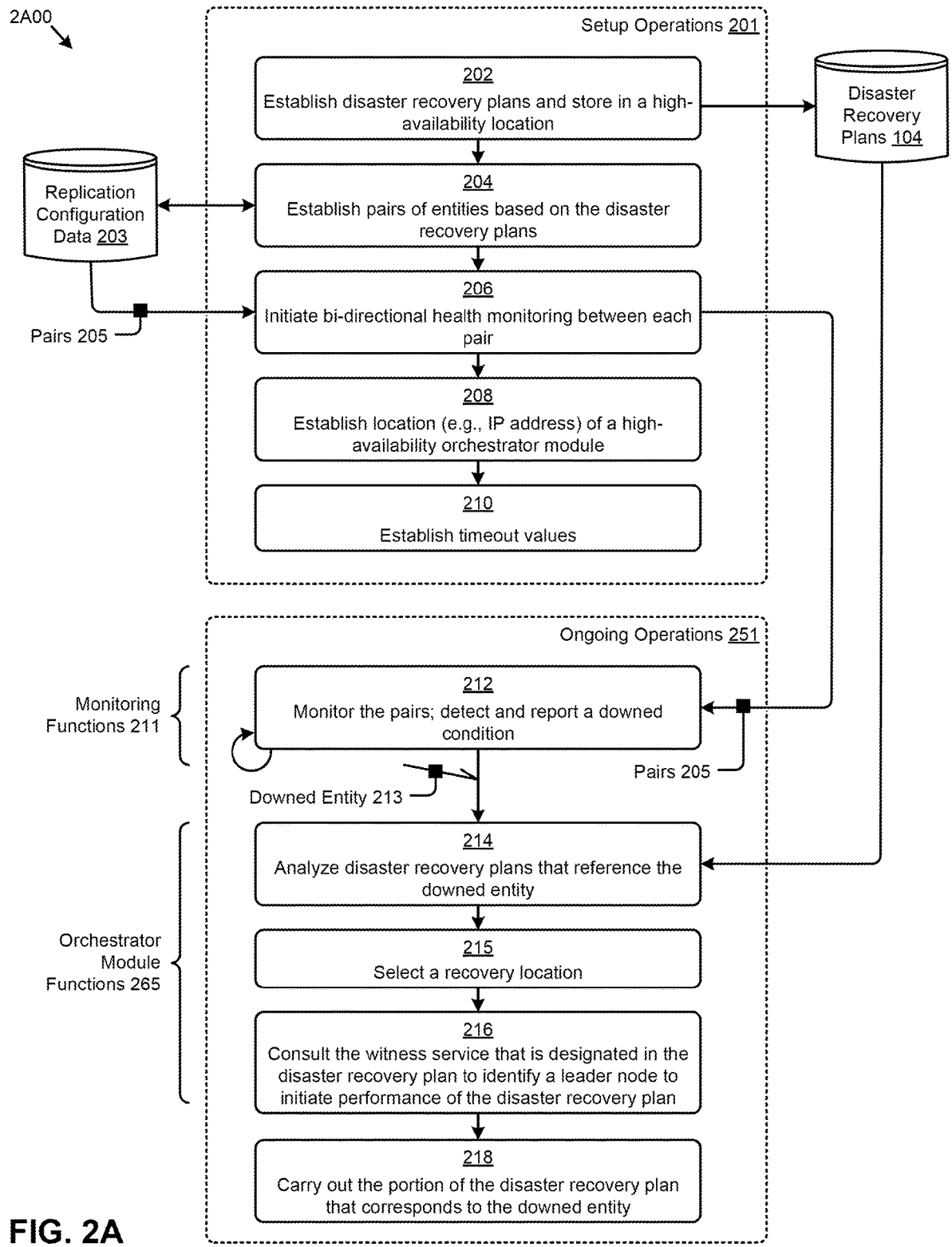
FIG. 2A shows a processing flow that facilitates disaster recovery planning and recovery, according to some embodiments.

FIG. 2A shows a processing flow 2A00 that facilitates disaster recovery planning and recovery. As an option, one or more variations of processing flow or any aspect thereof may be implemented in the context of the architecture and functionality of the embodiments described herein. The processing flow or any aspect thereof may be implemented in any environment.

As shown, the processing flow of FIG. 2A includes a flow of setup operations 201 as well as a flow of ongoing operations 251. The shown setup operations commence by establishing as many disaster recovery plans (step 202) as are needed and storing them in a durable storage location. In the shown embodiment, the disaster recovery plans 104 are stored in a high-availability database. The disaster recovery plans, either singly or in combination with any replication configuration data 203, are sufficient to facilitate automatic establishment of pairs 205 of entities that are to be paired for bi-directional health monitoring of each other (step 204). Each entity of a pair monitors its peer of the pair in a bi-directional manner (step 206) such that if one of the constituents of a pair is lost, then the other constituent of the pair can report the loss to the orchestrator module. In some embodiments, and as shown, the setup operations might include identification of a location (e.g., IP address) (step 208) of a high-availability orchestrator module. In some cases high availability is implemented, at least in part, by a floating IP address.

Any one or more of the entities of a pair can be dispersed across a large geography. As such, network communications may be subject to latencies that are commensurate with the dispersion. Accordingly, a series of timeout values are established (step 210). Strictly as one example, a timeout value for network communications between a private cloud and a geographically co-located orchestrator module might be set to 20 seconds or 60 seconds, whereas a timeout value for network communications between a public cloud and a distally-located orchestrator module might be set to 3 minutes or 5 minutes, etc. The timeout values and, more specifically, the timeout values that correspond to communications between an entity and an orchestrator module, can in some cases be used to favor one replacement entity host over another replacement entity host.

Once the setup operations 201 have been at least partially started, ongoing operations 251 can commence. In some embodiments, such as is depicted in FIG. 2A, the disaster recovery plans established in the setup operations are accessed by the ongoing operations. Specifically, and as shown, monitoring functions 211 can be implemented using the pair of entities that are defined in the replication configuration data and/or in the disaster recovery plans. Such monitoring functions might include detecting and reporting a downed entity condition (step 212) by a surviving one of a pair.

Ongoing operations 251 also include orchestrator module functions 265. Specifically, and as shown, certain of the orchestrator module functions might be invoked when a downed condition is detected and reported by one entity of a pair. The reporting may include an identification of the entity that is deemed to have been lost (e.g., via downed entity 213). The lost computing entity can be a cluster, or a node, or an application or a hypervisor, or a virtual machine, etc. As such, the orchestrator module can analyze disaster recovery plans that references the downed entity (step 214).

One aspect or result of analyzing disaster recovery plans that reference the downed entity is that one or more candidate recovery locations can be identified (step 215). Identification of candidate hosts that can serve as a replacement entity can be performed concurrently or sequentially with respect to analyzing disaster recovery plans and/or replication configuration data that references the downed entity. For example, the orchestrator module might identify a first alternative replacement cluster entity E3 to be a candidate host for a virtual machine or executable container or app from downed cluster E1, as well as a second alternative replacement for a virtual machine or app from downed cluster E1, the second alternative being an available node (not shown) corresponding to entity E1.

It often happens that there are multiple alternative recovery options involving multiple different recovery locations. In such cases, a witness service is consulted to elect a leader from among different candidate computing entities at the at least two different recovery locations.

In the foregoing example scenario, the orchestrator module and/or the individual ones of the multiple candidate hosts will consult a witness service so as to identify one leader (step 216). The identified leader then initiates and/or carries out the portion of the disaster recovery plan that corresponds to the downed entity (step 218). As previously indicated, disaster recovery plans can be stored in a durable storage location, and/or in multiple durable storage locations. This is shown and described as pertains to FIG. 2B1 and FIG. 2B2.

Moreover, the pairs 205 taken from the replication configuration data 203 can be combined with the disaster recovery plan 104 in order to derive multiple alternative recovery options. For example, and referring to the example of FIG. 1C, if an application "App1" is configured into a recovery plan as referring to VM1 and VM3, and the replication configuration data indicates a replication site for VM1 at E3 and a replication site for VM3 at E4, then two recovery options for the application "App1" would be possible. Specifically, Option #1 is to bring-up a replacement VM1 on E3 and connect replacement VM1 on E3 to VM3 on E2 to implement "App1". Option #2 is to bring-up a replacement VM1 on E3 and a replacement VM3 on E4 and connect replacement VM1 on E3 to replacement VM3 on E4.

FIG. 2B1 and FIG. 2B2 show example disaster recovery plan repositories 2B00 that are used in implementing various disaster recovery operations. As an option, one or more variations of disaster recovery plan repositories or any aspect thereof may be implemented in the context of the architecture and functionality of the embodiments described herein.

As shown in FIG. 2B1, a first set of disaster recovery plans $104_{MASTER}$ repository is backed up by any number of high-availability disaster recovery plan copies that are situated in different availability zones (e.g., a second copy of disaster recovery plans $104_{ZONE1}$, or an 2nd copy of disaster recovery plans $104_{ZONE2}$). More specifically, and in accordance with the example shown, the number of high-availability disaster recovery plan copies may correspond to the number of availability zones involved in the recovery plans as a whole. For example, and as depicted, the shown disaster recovery plans include eight availability zones, "Zone1", "Zone2", . . . , "Zone7", and "Zone8". As such, the number of high-availability disaster recovery plan copies may correspond to those availability zones. Each individual disaster recovery plan can be indexed so as to be accessed individually by any one or more of the orchestrator modules, and/or any one or more of any other operational modules that implement the setup operations, and/or any one or more operational modules that implement the ongoing operations.

An individual disaster recovery plan may be individually identified by a specific ID (e.g., an "RP ID") and any individual disaster recovery plan may specify one or more of, an "Availability Zone", an "Entity Type" or a "Compound Type", a "Script ID", a particular "Witness Service" (e.g., via an IP address), and "Script Delays" The fields and values can be stored in a manner so as to make them individually accessible. Moreover the fields and values can be stored in a manner so as to make them individually modifiable by any operational module.

The script IDs refer to a script that is executed in the context of a recovery operation. The scripts may perform configuration of a VM and/or a hypervisor, and/or an application, and/or a node, and/or a replication pair, and/or a zone boundary, etc. Moreover, scripts may perform reconfiguration of a database server used by a VM, and/or reconfiguration of vDisks belonging to a restored VM, and/or reconfiguration of network connections, etc.

The shown numeric delays refer to a number of minutes to delay between phases of bring-up during recovery. There can be any number of bring-up phases, and each phase has a delay value that is observed before proceeding to the next phase. Strictly as one example, there may be a 1 minute delay after bring-up of a database server VM, which 1 minute delay is observed prior to bring-up of any database server ancillary processes, VMs, containers, etc. Runnable code in the scripts may refer to the delays.

As depicted in the embodiment of FIG. 2B2 any recovery plan entry may further include information pertaining to naming and/or configuration a target location. This is shown by the entries in the column labeled "Target Recovery Information".

In the shown embodiment, each row corresponding to a particular disaster recovery plan ID may codify target recovery information. Such information may include information pertaining to a replication copy of data and/or a replication or standby instance of an application, and/or such information may include information pertaining to specific dormant VMs. In this example, the target recovery information specifies that a standby VM of application "App", namely VM1 is prepositioned as VM1' and that a standby VM for application "App", namely VM3 is prepositioned as VM3'. The specific location (e.g., host node location) can be determined from replication configuration data.

Further, FIG. 2B2 illustrates how a recovery plan can codify specific parameters pertaining to (1) sets of hierarchically-related disaster-protected entities (e.g., monitored entities 241), (2) user-specified witness service location(s) and usage (e.g., witness service parameters 242), and (3) target recovery information (e.g., recovery entity parameters 243).

The figure depicts high-availability, distributed disaster plans. As shown a first set of disaster recovery plans $104_{MASTER}$ repository is backed up by any number of high-availability disaster recovery plan copies (e.g., second copy of disaster recovery plans $104_{D1}$, or an Nth copy of disaster recovery plans $104_{DN}$). The location of such high-availability, distributed disaster plans may or may not correlate to availability zone or fault domains. Rather, the distribution may be to any computing entity that can host a data structure for access by another computing entity. In the example shown, each individual disaster recovery plan (e.g., each row) can be indexed so as to be accessed individually by any one or more of the orchestrator modules, and/or any one or more of any other operational modules that implement the setup operations, and/or any one or more operational modules that implement the ongoing operations.

Figure 3:
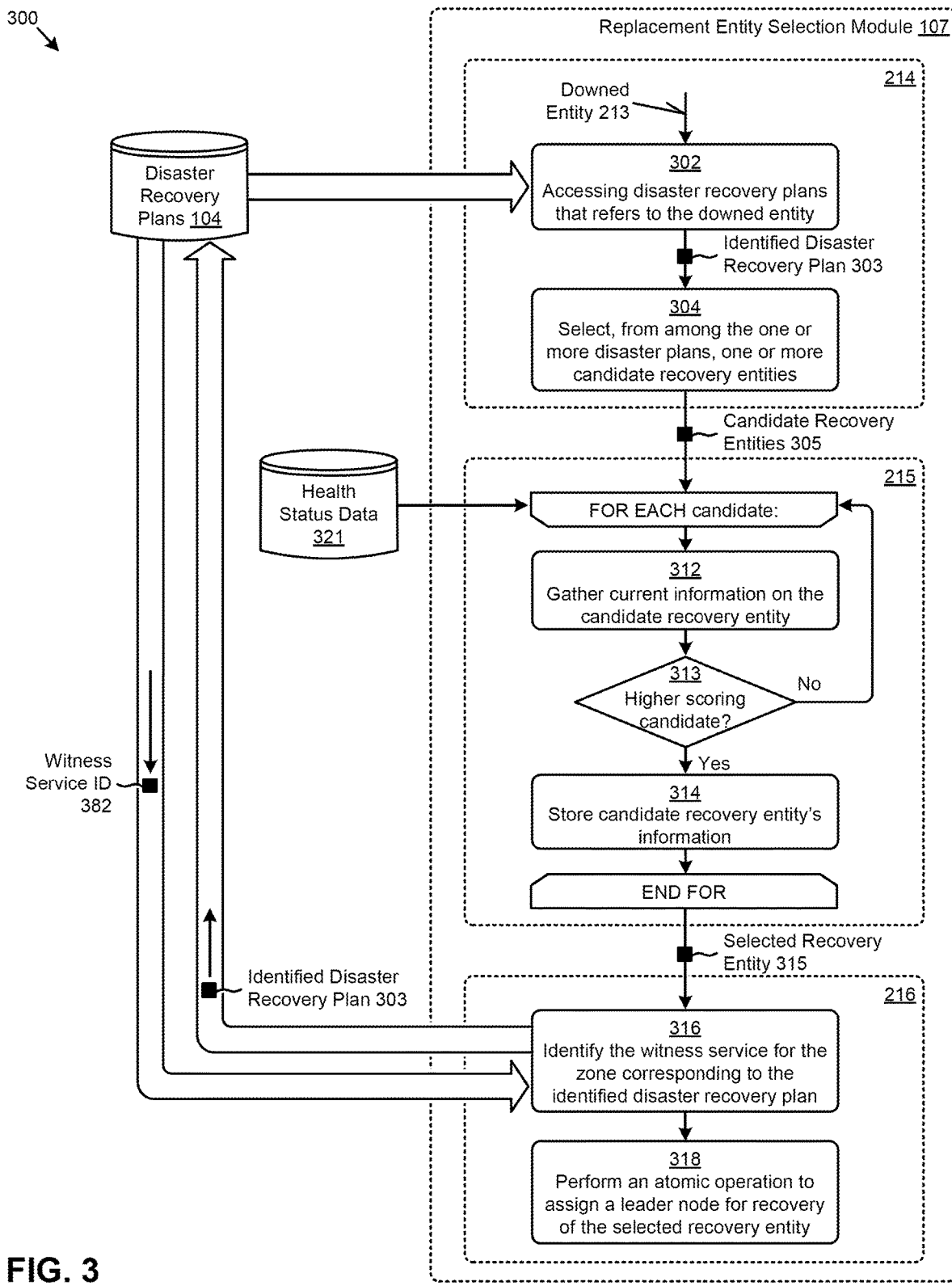
FIG. 3 shows a system that facilitates selection of recovery entities to implement recovery from a disaster, according to some embodiments.

FIG. 3 shows a system 300 that facilitates selection of recovery entities to implement recovery from a disaster. In the specific embodiment of FIG. 3, system 300 implements one configuration of a processing flow of replacement entity selection module 107. The processing flow commences upon occurrence of an event that causes any entity monitors to deem a loss of function of one or more monitored entities. In the example shown, occurrence of a downed entity 213 causes invocation of steps that result in identification of one or more candidate replacement entities that can serve as a replacement for the downed entity. Such candidate replacement entities can be identified by accessing disaster recovery plans that refers to the downed entity (step 302).

There may be multiple disaster recovery plans or portions thereof that refer to a downed entity and, in such cases, steps are taken to select applicable or preferred disaster recovery plans or portions thereof. There may be cost (e.g., public cloud subscription costs) or environmental conditions (e.g., geographic distribution of the constituent elements to be recovered) that would serve to inform the selection of applicable or preferred disaster recovery plans. Once at least one disaster recovery plan has been identified (e.g., identified disaster recovery plan 303), the identified disaster recovery plan is parsed to find one or more candidate recovery entities (step 304). A set of candidate recovery entities 305 is provided to downstream processing for assessing and selecting one candidate recovery entity from among the candidate recovery entities. Such as assessment may consider the then-current environmental conditions, possibly including any health status data 321 that has been or is being populated by any of the foregoing monitoring functions. More specifically, a FOR EACH loop is entered and within this loop, the then-current information pertaining to the particular candidate of the loop is gathered. Based on the gathered then-current information, a quantitative score is calculated (step 312). At decision 313, if the particular candidate being considered in the current iteration of the loop scores higher than any of the previously considered candidates (if any), then the "Yes" path is taken and information pertaining to that candidate recovery entity is stored (step 314), otherwise the "No" path is taken and the next candidate (if any) is considered. After all candidate recovery entities 305 have been considered, then processing moves to still further downstream processing. Since the highest-scoring candidate's information had been stored (step 314), then that highest-scoring candidate is deemed to be the selected recovery entity 315.

To illustrate, consider disaster recovery plan RP1 of FIG. 2B2. This recovery plan includes target recovery information that specifies a possible path to recovery of the application "App" by bring-up of VM1' and VM3'. Now, referring to the environments of FIG. 1A1 and FIG. 1A2, it might happen that both the entity "E1" that hosts VM1 and the entity "E2" that hosts VM3 are down. In this case, implementation of one variation of recovery plan RP1 would cause the application "App" to be relocated to where "VM1'" and "VM3'" are pre-positioned as dormant VMs. In another situation, it might happen that only the entity "E1" that hosts VM1 is down, and thus only VM1' would need to be brought up as a replacement. Accordingly, as in this case, implementation of a different variation of recovery plan RP1 causes the "VM1'" to be configured into application "App", thus replacing the downed VM1 that was formerly running on entity E1. The foregoing are merely illustrative examples of selecting one, from among a plurality of choices of hierarchically-related entities, to be brought up for disaster recovery.

Once a selected recovery entity has been identified, a candidate leader node is identified. The candidate leader node vies for taking on the actual leadership role with any one or more other candidate leader nodes. The determination of exactly one from among a plurality of candidate leader nodes is made by consulting a witness service. Continuing with the foregoing illustrative example, when implementing recovery plan RP1, the specific witness service as specified for the recovery plan RP1 is identified (step 316) and consulted (step 318). More specifically, the disaster recovery plans 104 are accessed with an index or other identifier corresponding to the particular identified disaster recovery plan 303. The data structure corresponding to the identified disaster recovery plan includes a witness service identifier (e.g., the shown witness service ID 382) and that particular witness service is accessed so as to perform an atomic operation that assigns exactly one leader node from among any of a plurality of candidate leader nodes. In some cases, one or more of a plurality of candidate leader nodes might be only temporarily unreachable. In such a case, if a formerly unreachable candidate leader node thereafter became reachable, it would not take on the leader role.

The particular witness service that is accessed so as to perform an atomic operation that assigns exactly one leader node from among any of a plurality of candidate leader nodes is a witness service that can be identified by a user. In some cases, a user interface is provided to permit a user to specify preferred witness services. Such a user interface is shown and described as pertains to FIG. 4.

Figure 4:
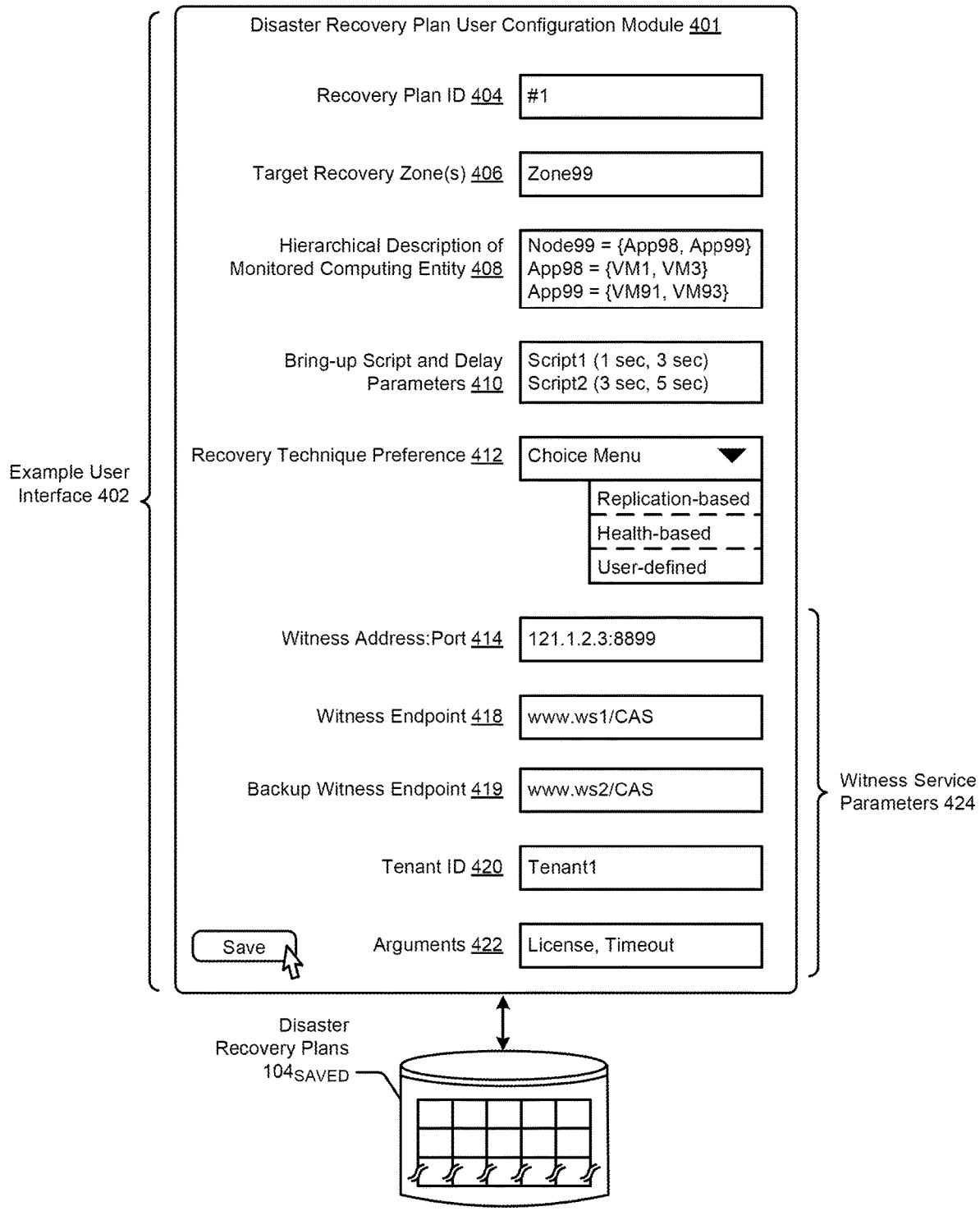
FIG. 4 shows a disaster recovery plan configuration module, according to some embodiments.

FIG. 4 shows a disaster recovery plan configuration module 401. Also shown in FIG. 4 is an example user interface 402 for configuring a disaster recovery plan. The user interface facilitates user input of parameters that influence how a system is recovered after a disaster event. More specifically, the user interface facilitates user specification of a recovery plan ID 404, specification of one or more preferred target recovery zones 406, a hierarchical description of monitored computing entities 408, a bring-up script and delay parameters 410, a recovery technique preference 412, and various witness service parameters 424.

The recovery technique preference may include several options. Strictly as an example, the options might include replication-based technique where determination of a site for recovery of an entity is weighted toward the site where replication has been in progress for data of the entity to be recovered. As another example, the options might include health-based technique where determination of a site for recovery of an entity is weighted toward a site that exceeds a threshold of health. Still another option might be to assign the recovery technique preference to a use a user-defined technique.

Returning to the shown example, witness service parameters include identification of a witness service using dotted quads and a port (e.g., via witness address:port 414). The example witness service parameters may further include a witness endpoint 418, a backup witness endpoint 419, a tenant ID 420 and other arguments 422 as may be needed for operation of the foregoing witness endpoints.

Once the user has entered the requisite information, the user can press the SAVE button. The action of the SAVE button is to store the particular disaster recovery plan to a set of disaster recovery plans (e.g., disaster recovery plans $104_{SAVED}$).

Any number of individual disaster recovery plans can be saved. In some cases, the individual disaster recovery plans can be saved directly into a master set which can be made accessible at some durable storage location.

Third-Party Witness Services

In some embodiments, a witness service is hosted by a third-party entity. For example, the third-party entity might be a public cloud provider. In some cases, geographically-distal entities are used to determine whether a workload should run on a primary or secondary infrastructure. As such, a witness can be used and when there are changes to the master of the recovery plans, an orchestrator can then comport with the modified recovery plan.

Geographically-Distal Entities

To avoid manual intervention and to detect failures, it is sometimes felicitous to monitor entities (e.g., clusters) from different fault domains. As such, a witness can facilitate automated failure/recovery when some entity of the primary site is deemed to be down, or when the primary site is not able to reach the secondary site.

Witness Locking Mechanisms

In some implementations, a witness has a locking facility that any entity can use to claim leadership. In this type of implementation, a database is maintained such that every entry in that database has: a UUID, a logical_timestamp, a leader_id_vec[ ], a secondary_id_vec[ ], etc. The data item leader_id_vec is vector of clusters present in source fault domain (or leader fault domain). The data item secondary_id_vec is vector of clusters present in some other participating fault domain and the data item unique identifier for the relationship. The logical_timestamp is the compare and swap (CAS) value for the lock. Entities that try to take a lock will increase their copy of their logical_timestamp and send it to the witness. If the logical_timestamp sent is greater than that stored in the witness, lock will be guaranteed; otherwise, failure will be returned to the sender.

Witness Deployment

In some implementations, a witness service can be delivered as a containerized service composed of two containers:
1. Sprint boot witness app: This serves the rest of the APIs.
2. DB container: a container running the mongo DB to store the relationship parameters.

Witness Data Model

In one example witness data model, witness information data structure contains the following fields:
1. Witness Name
2. Remote Connection UUID
3. Witness IP address
4. Witness ID Orchestrator Functions In one embodiment, the orchestrator is an entity that can be situated in a fault domain separate from the fault domains of the primary or secondary site entities. The orchestrator does the processing needed to be done for (1) onboarding a recovery plan, (2) performing leadership election with witness, (3) failure handling, and (4) failback processing. Strictly as additional example details, onboarding a recovery plan with the witness may comprise:
1. Failure handling during onboarding.
2. Scanning the VMs which do not have witness enabled, but comes under a recovery plan with witness enabled.
3. Executor tasks to handle failures.
4. Garbage Collector to collect stale entries.
5. Dealing with external failovers.

An orchestrator can be implemented as a plug-in where a recovery plan registers certain functions that can be called from operational elements to perform specific functions. Strictly as examples, the functions might include:
1. GetEntitiesInplan(plan_uuid): This function gets the list of entities affected by the recovery plan.

2. HandleFailure(list of source participants, list of target participants, bool is_source_new_leader, plan_uuid, plan_params): This function handles the failure after lock has been taken. List of source participants is a list of participants on source fault domain and list of target participants is a list of participants on target fault domain. "plan_uuid" is uuid of the recovery plan and "plan_params" are parameters stored during onboarding necessary to run the recovery plan. The "is_source_new_leader" argument is Boolean to tell if the source has become the leader or target so the appropriate actions can be taken. This function adds the appropriate information to an executor queue that is configured to handle failure events.
3. GetClusterPairs(list<vm_uuid>): This function returns a list of pairs of clusters which are added to one or more relationships (e.g., to pairwise relationships). In some cases such pairs may already be established into other one or more relationships.

Onboarding a Recovery Plan

Onboarding includes the following functions:
1. Taking a lock with the witness.
2. Updating orchestrator database.
3. Enabling additional witnesses.

Pairwise Locks Using a Witness

In some embodiments, the orchestrator interacts with the witness and takes a lock for the entity pairs inferred from the entities specified in the recovery plan. Granularity of the locks taken will depend on the entity under consideration and/or its position in a hierarchy of entities.

Updating Orchestrator Database

After acquiring the lock or locks via witness processing may be undertaken to add an entry into data structures accessed by the orchestrator module(s). As such, for each lock taken, one entry will be created in the orchestrator data structures. When updating data structure entries, these entries are persisted on all the participant AZs. In some cases, all entries are persisted on all the participant AZs. On other cases, the only entries that are persisted are those entries that correspond to the AZs of the participating entities.

Example Operational Element Failure Handling by the Orchestrator

In event of a failure being detected, the orchestrator is called. In exemplary deployments the orchestrator is called by one of a pair of clusters and the orchestrator elects a new leader. For example, assume the connection between cluster C1 and cluster C2 has failed. Then cluster C1 will call the orchestrator and also cluster C2 will call the orchestrator. Once the orchestrator has received the call(s) then orchestrator does the following:
1. Find all the entries in the orchestrator database where C1 is present in source fault domain and C2 is present in target fault domain. In example cases, only those entries will be considered that have "is_leader_entry" set to True.
2. For all these entries:
   a. If the entry has 'is_failover_triggered' or 'is_failover_running' flag set, ignore the entry.
   b. Contact the witness to increase the logical timestamp and make C1 as leader and participants empty.
3. If the lock does not get acquired, move to the next entry.
4. If the lock gets acquired, then call the Failure Handling function of the plug-in.
5. After that, find all the entries in the orchestrator database where C1 is present in target fault domain and C2 is present in source fault domain. Pick the entry with "is_leader_entry" set to False. If the entry has 'is_failover_triggered' or 'is_failover_running' flag set, ignore the entry.
6. Wait for some time to allow the source side (C2 in this case) to take lock on its corresponding entry.
7. For all these entries, contact the witness to increase the logical timestamp and make C1 as leader.
8. If the lock does not get acquired, move to the next entry.
9. If the lock gets acquired, then call the Failure Handling function of the plug-in for that entry, with is_source_leader set to False.

Scanner

Once a recovery plan is onboarded to the orchestrator the witness settings are informed to all the VMs; after that, if there is any new VM or other entity being added to the recovery plan, a facility enables the witness setting for that new VM or other entity. In some embodiments, a periodic scan does the following:
1. Get the list of VMs affected by a recovery plan and see if every VM has witness enabled.
2. For the VMs on which witness is not enabled, enable the witness.
3. Contact a plug-in about the payload to be stored in the orchestrator database.
4. The plug-in will try to find a matching entry (e.g., with matching clusters and recovery plan uuids) in the database.
   a. If it finds the entry, then just enable the witness on VM:
      i. If the 'is_failover_running' flag is not set, use that entry.
      ii. If the 'is_failover_running' flag is set, wait for that entry to be either garbage collected or 'is_failover_running' flag to be removed.
   b. In case witness is not enabled for the cluster pair between which that VM is protected then:
      i. The scanner needs to first take a lock for those clusters.
      ii. Update the orchestrator database, which will sync the entries on all the participants.

Garbage Collection of Stale Entries

A garbage collection facility removes stale entries in the orchestrator table. There are two criteria for garbage collecting (e.g., removing) the entry:
1. The to_remove flag is set.
2. The entry in witness is deleted.

Initiating Failover

In some embodiments, remote procedure calls (RPCs) are used to initiate failover. In such embodiments, the orchestrator carries out several steps:
1. Talk to the designated witness to take leadership lock.
2. Update orchestrator database. For example, mark the 'is_failover_running' flag to stop other witness initiated failovers. If 'is_failover_running' is already set, fail the operation since recovery plan is already running.
3. Send the RP uuid to executor for polling.

The foregoing RPCs should be idempotent such that, in case the recovery plan is already running, then it should not do anything and fail the new run with appropriate error. In case recovery plan is not running and 'is_failover_triggered' is set to True, still go ahead with this new user triggered recovery plan. This will be the case when the witness triggered failover of recovery plan had failed and then the user retriggered it.

Adding a Witness to Recovery Plan

Once a witness is configured in any availability zone, then a user can specify to enable using that witness in the corresponding recovery plans. More specifically, in the recovery plan data structures, a user can specify cluster pairs. A user can specify a witness ID for those cluster pairs. In some cases the witness identifier is or includes the IP of the witness.

Identifying a Recovery Plan by a Witness

In some cases, a witness service is configured to identify a recovery plan based in the failure event.

System Architecture Overview

Additional System Architecture Examples

All or portions of any of the foregoing techniques can be partitioned into one or more modules and instanced within, or as, or in conjunction with, a virtualized controller in a virtual computing environment. Some example instances within various virtual computing environments are shown and discussed as pertains to FIG. 5A, FIG. 5B, FIG. 5C, and FIG. 5D.

Figure 5A:
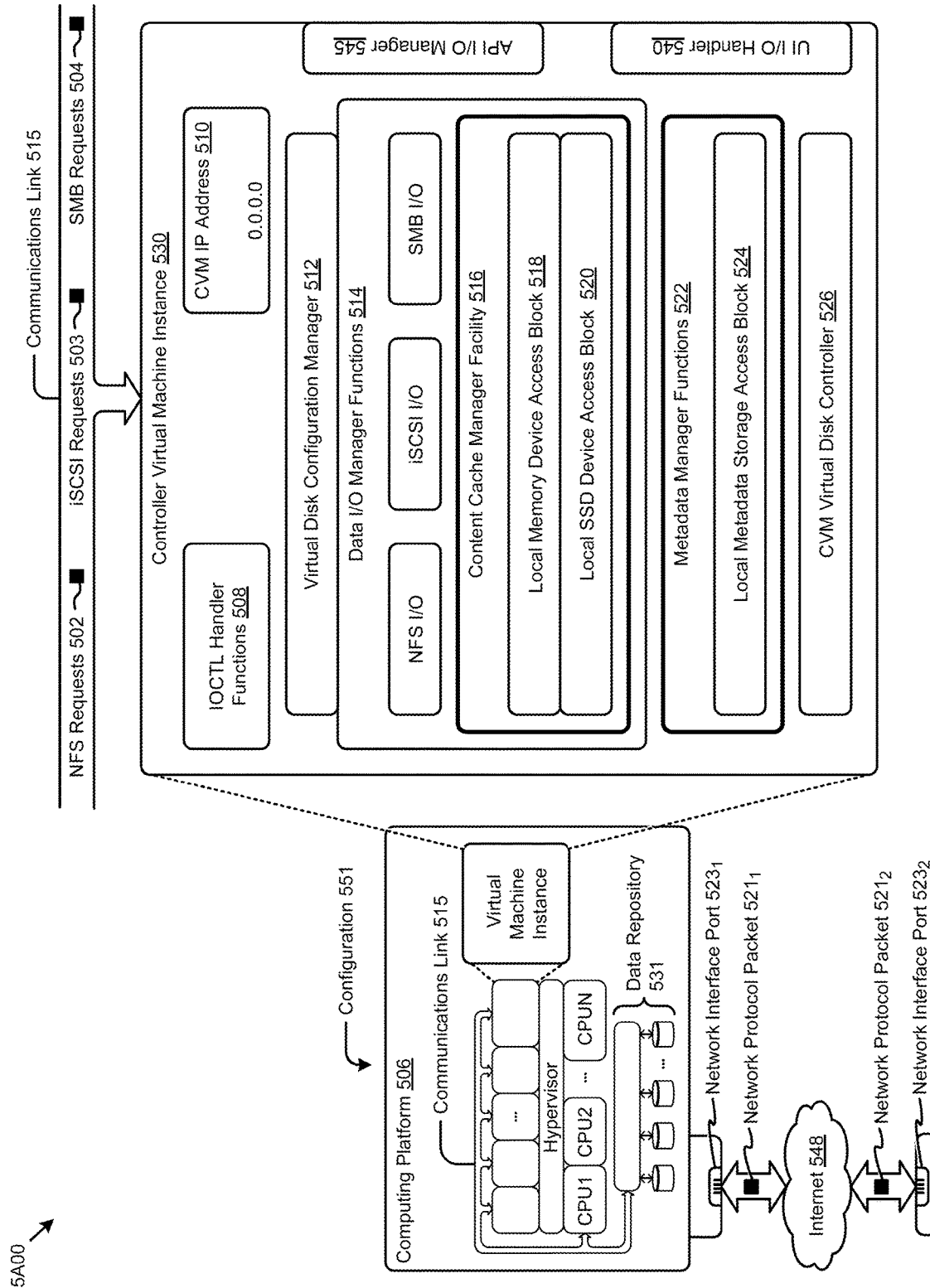
FIG. 5A, FIG. 5B, FIG. 5C, and FIG. 5D depict virtualization system architectures comprising collections of interconnected components suitable for implementing embodiments of the present disclosure and/or for use in the herein-described environments.

FIG. 5A depicts a virtualized controller as implemented in the shown virtual machine architecture 5A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 5A00 comprises a collection of interconnected components suitable for implementing embodiments of the present disclosure and/or for use in the herein-described environments. Moreover, virtual machine architecture 5A00 includes a virtual machine instance in configuration 551 that is further described as pertaining to controller virtual machine instance 530. Configuration 551 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 530.

In this and other configurations, a controller virtual machine instance receives block I/O storage requests as network file system (NFS) requests in the form of NFS requests 502, and/or internet small computer storage interface (iSCSI) block IO requests in the form of iSCSI requests 503, and/or Samba file system (SMB) requests in the form of SMB requests 504. The controller virtual machine (CVM) instance publishes and responds to an internet protocol (IP) address (e.g., CVM IP address 510). Various forms of input and output can be handled by one or more IO control handler functions (e.g., IOCTL handler functions 508) that interface to other functions such as data IO manager functions 514 and/or metadata manager functions 522. As shown, the data IO manager functions can include communication with virtual disk configuration manager 512 and/or can include direct or indirect communication with any of various block IO functions (e.g., NFS IO, iSCSI IO, SMB IO, etc.).

In addition to block IO functions, configuration 551 supports IO of any form (e.g., block IO, streaming IO, packet-based IO, HTTP traffic, etc.) through either or both of a user interface (UI) handler such as UI IO handler 540 and/or through any of a range of application programming interfaces (APIs), possibly through API IO manager 545.

Communications link 515 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 530 includes content cache manager facility 516 that accesses storage locations, possibly including local dynamic random access memory (DRAM) (e.g., through local memory device access block 518) and/or possibly including accesses to local solid state storage (e.g., through local SSD device access block 520).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 531, which in turn can be formatted into any one or more storage areas, and which can comprise parameterized storage accessible by a key (e.g., a filename, a table name, a block address, an offset address, etc.). Data repository 531 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 524. The data repository 531 can be configured using CVM virtual disk controller 526, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 551 can be coupled by communications link 515 (e.g., backplane, LAN, PSTN, wired or wireless network, etc.) and each instance may perform respective portions of sequences of instructions as may be required to practice embodiments of the disclosure.

The shown computing platform 506 is interconnected to the Internet 548 through one or more network interface ports (e.g., network interface port $523_1$ and network interface port $523_2$). Configuration 551 can be addressed through one or more network interface ports using an IP address. Any operational element within computing platform 506 can perform sending and receiving operations using any of a range of network protocols, possibly including network protocols that send and receive packets (e.g., network protocol packet $521_1$ and network protocol packet $521_2$).

Computing platform 506 may transmit and receive messages that can be composed of configuration data and/or any other forms of data and/or instructions organized into a data structure (e.g., communications packets). In some cases, the data structure includes program instructions (e.g., application code) communicated through the Internet 548 and/or through any one or more instances of communications link 515. Received program instructions may be processed and/or executed by a CPU as it is received and/or program instructions may be stored in any volatile or non-volatile storage for later execution. Program instructions can be transmitted via an upload (e.g., an upload from an access device over the Internet 548 to computing platform 506). Further, program instructions and/or the results of executing program instructions can be delivered to a particular user via a download (e.g., a download from computing platform 506 over the Internet 548 to an access device).

Configuration 551 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 52 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to disaster recovery plan processing using a designated witness for disaster recovery. In some embodiments, a module may include one or more state machines and/or combinational logic used to implement or facilitate the operational and/or performance characteristics pertaining to disaster recovery plan processing using a designated witness for disaster recovery.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of disaster recovery plan processing using a designated witness for disaster recovery). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to disaster recovery plan processing using a designated witness for disaster recovery, and/or for improving the way data is manipulated when performing computerized operations pertaining to executing only those particular portions of a disaster recovery plan that pertain a particular lost entity.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 5B:
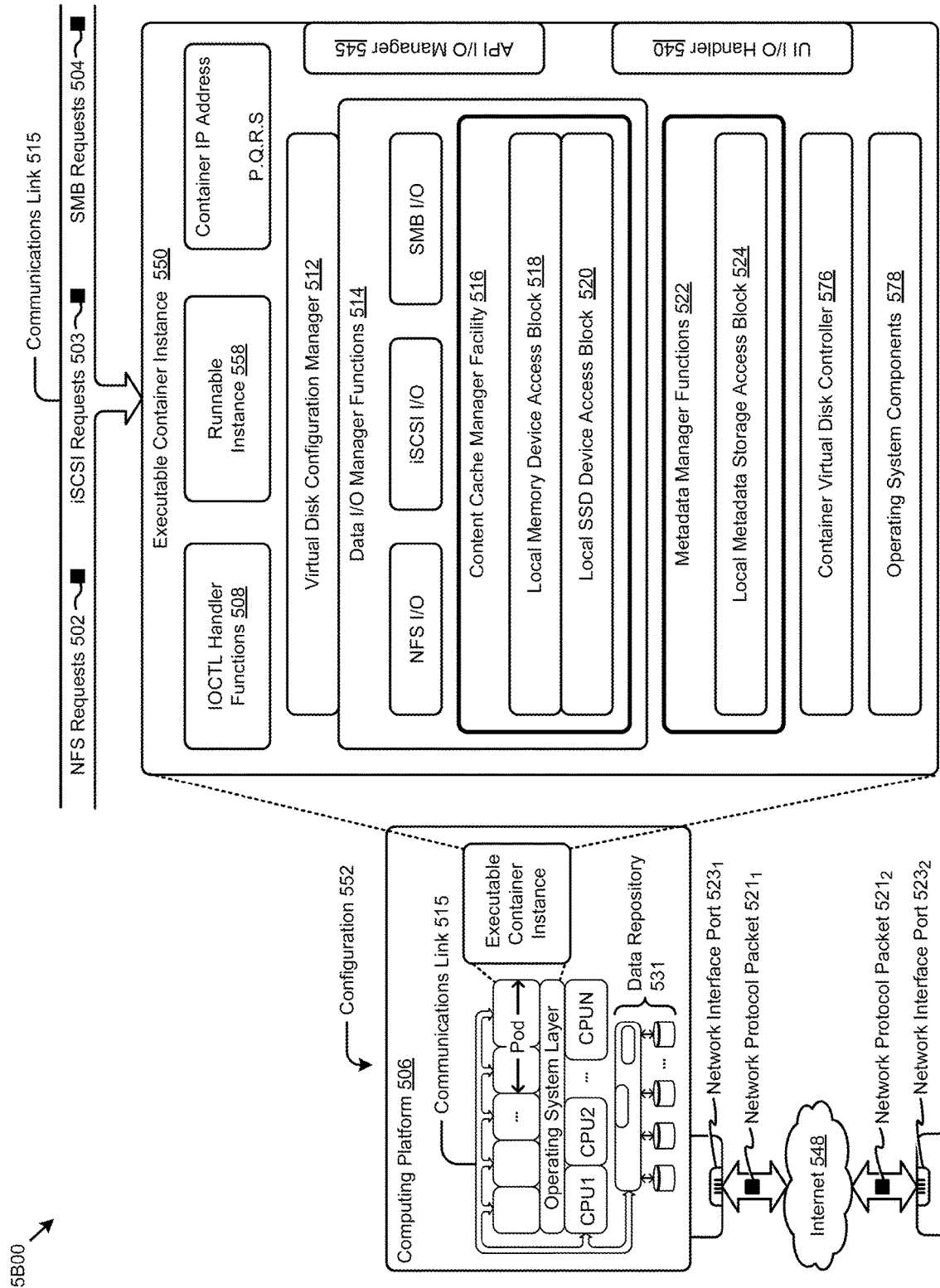

FIG. 5B depicts a virtualized controller implemented by containerized architecture 5B00. The containerized architecture comprises a collection of interconnected components suitable for implementing embodiments of the present disclosure and/or for use in the herein-described environments. Moreover, the shown containerized architecture 5B00 includes an executable container instance in configuration 552 that is further described as pertaining to executable container instance 550. Configuration 552 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 550). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 578, however such a separate set of operating system components need not be provided. As an alternative, an executable container can include runnable instance 558, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 576. Such a container virtual disk controller can perform any of the functions that the aforementioned CVM virtual disk controller 526 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 5C:
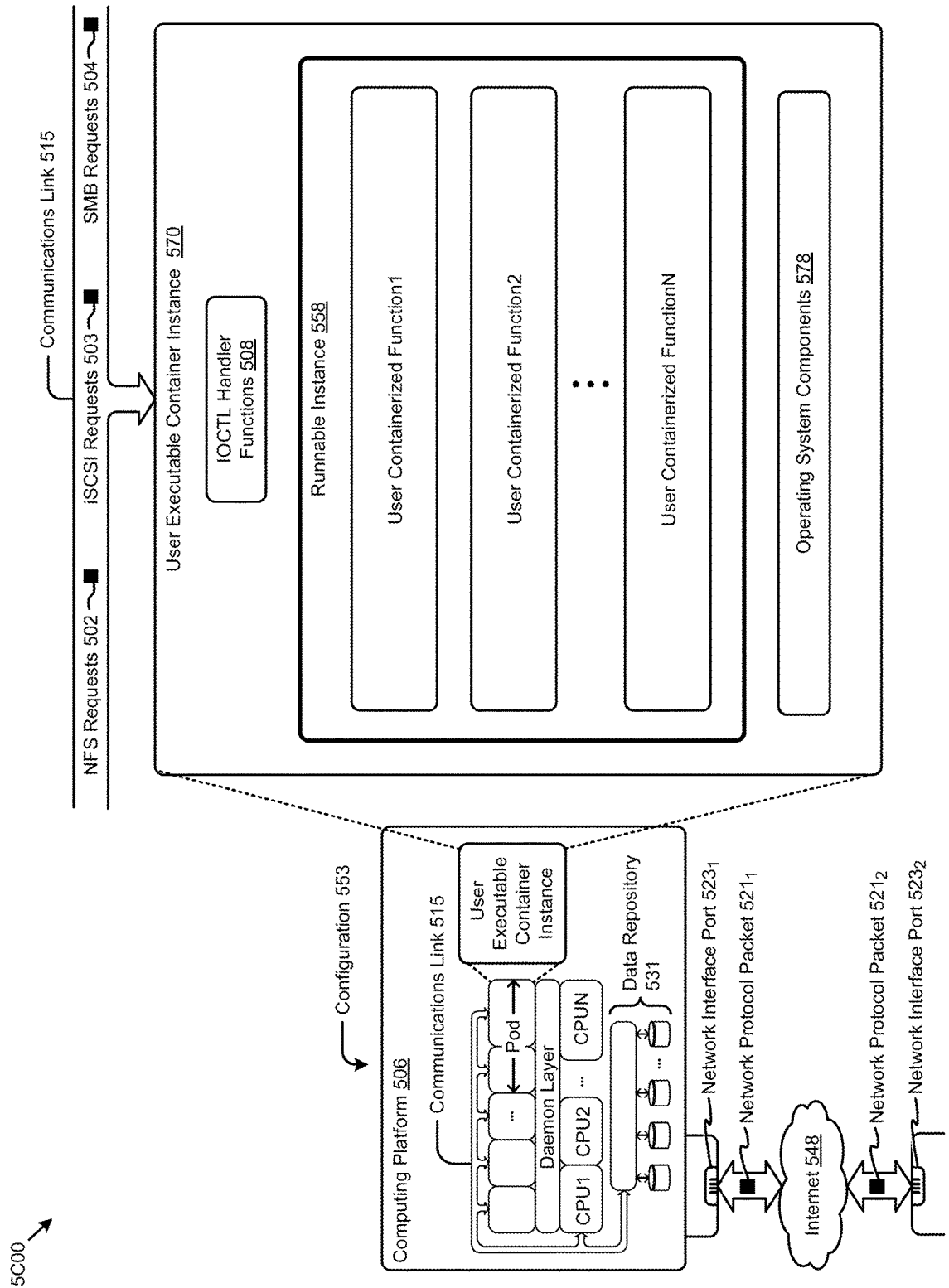

FIG. 5C depicts a virtualized controller implemented by a daemon-assisted containerized architecture 5C00. The containerized architecture comprises a collection of interconnected components suitable for implementing embodiments of the present disclosure and/or for use in the herein-described environments. Moreover, the shown daemon-assisted containerized architecture includes a user executable container instance in configuration 553 that is further described as pertaining to user executable container instance 570. Configuration 553 includes a daemon layer (as shown) that performs certain functions of an operating system.

User executable container instance 570 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 558). In some cases, the shown operating system components 578 comprise portions of an operating system, which portions are interfaced with or included in the runnable instance and/or any user containerized functions. In this embodiment of a daemon-assisted containerized architecture, the computing platform 506 might or might not host operating system components other than operating system components 578. More specifically, the shown daemon might or might not host operating system components other than operating system components 578 of user executable container instance 570.

The virtual machine architecture 5A00 of FIG. 5A and/or the containerized architecture 5B00 of FIG. 5B and/or the daemon-assisted containerized architecture 5C00 of FIG. 5C can be used in any combination to implement a distributed platform that contains multiple servers and/or nodes that manage multiple tiers of storage where the tiers of storage might be formed using the shown data repository 531 and/or any forms of network accessible storage. As such, the multiple tiers of storage may include storage that is accessible over communications link 515. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 551 of FIG. 5A) to manage the interactions between the underlying hardware and user virtual machines or containers that run client software.

Distinct from user virtual machines or user executable containers, a special controller virtual machine (e.g., as depicted by controller virtual machine instance 530) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 5D:
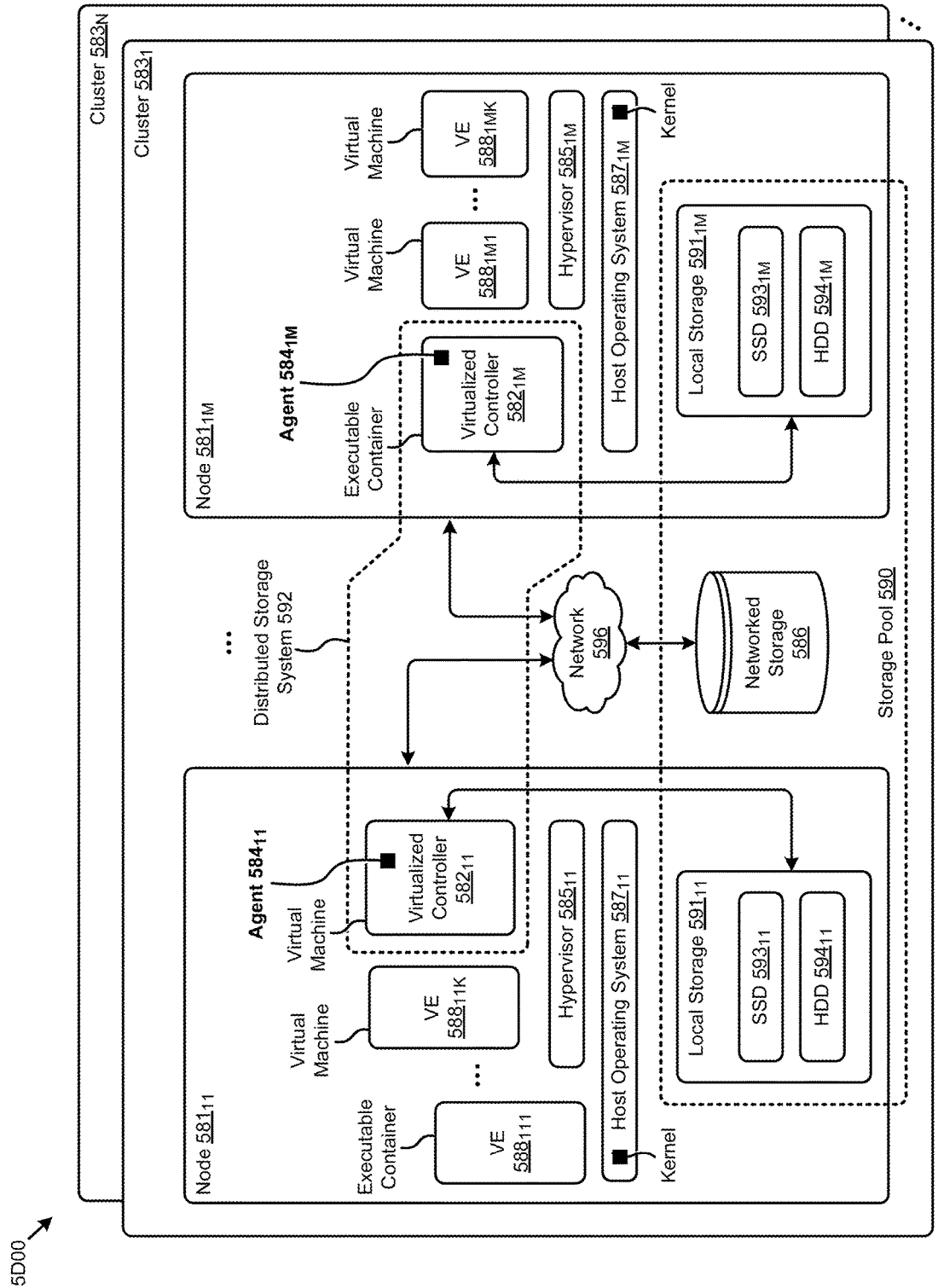

FIG. 5D depicts a distributed virtualization system in a multi-cluster environment 5D00. The shown distributed virtualization system is configured to be used to implement the herein disclosed techniques. Specifically, the distributed virtualization system of FIG. 5D comprises multiple clusters (e.g., cluster $583_1$, . . . , cluster $583_N$) comprising multiple nodes that have multiple tiers of storage in a storage pool. Representative nodes (e.g., node $581_{11}$, . . . , node $581_{1M}$) and storage pool 590 associated with cluster $583_1$ are shown. Each node can be associated with one server, multiple servers, or portions of a server. The nodes can be associated (e.g., logically and/or physically) with the clusters. As shown, the multiple tiers of storage include storage that is accessible through a network 596, such as a networked storage 586 (e.g., a storage area network or SAN, network attached storage or NAS, etc.). The multiple tiers of storage further include instances of local storage (e.g., local storage $591_{11}$, . . . , local storage $591_{1M}$). For example, the local storage can be within or directly attached to a server and/or appliance associated with the nodes. Such local storage can include solid state drives (SSD $593_{11}$, . . . , SSD $593_{1M}$), hard disk drives (HDD $594_{11}$, . . . HDD $594_{1M}$), and/or other storage devices.

As shown, any of the nodes of the distributed virtualization system can implement one or more user virtualized entities (e.g., VE $588_{111}$, . . . , VE $588_{11K}$, . . . , VE $588_{1M1}$, . . . , VE $588_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $587_{11}$, . . . , host operating system $587_{1M}$), while the VMs run multiple applications on various respective guest operating systems. Such flexibility can be facilitated at least in part by a hypervisor (e.g., hypervisor $585_1$, . . . , hypervisor $585_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $587_{11}$, . . . , host operating system $587_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 590 by the VMs and/or the executable containers.

Multiple instances of such virtualized controllers can coordinate within a cluster to form the distributed storage system 592 which can, among other operations, manage the storage pool 590. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $581_{11}$ can interface with a controller virtual machine (e.g., virtualized controller $582_{11}$) through hypervisor $585_{11}$ to access data of storage pool 590. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 592. For example, a hypervisor at one node in the distributed storage system 592 might correspond to software from a first vendor, and a hypervisor at another node in the distributed storage system 592 might correspond to a second software vendor. As another virtualized controller implementation example, executable containers can be used to implement a virtualized controller (e.g., virtualized controller $582_{1M}$) in an operating system virtualization environment at a given node. In this case, for example, the virtualized entities at node $581_{1M}$ can access the storage pool 590 by interfacing with a controller container (e.g., virtualized controller $582_{1M}$) through hypervisor $585_{1M}$ and/or the kernel of host operating system $587_{1M}$.

In certain embodiments, one or more instances of an agent can be implemented in the distributed storage system 592 to facilitate the herein disclosed techniques. Specifically, agent $584_{11}$ can be implemented in the virtualized controller $582_{11}$, and agent $584_{1M}$ can be implemented in the virtualized controller $582_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to executing only those particular portions of a disaster recovery plan that pertain a particular lost entity can be brought to bear through implementation of any one or more of the foregoing embodiments. Moreover, any aspect or aspects of carrying out only selected portions of a disaster recovery plan that pertain to recovering a lost entity can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts comprising:

configuring a recovery plan to address a recovery in a virtualization system, wherein the recovery plan identifies a witness that corresponds to a subset of entities of the virtualization system, and wherein the witness is used to elect a leader to implement the recovery in the virtualization system;

identifying an event in the virtualization system that triggers the recovery, wherein the recovery is of at least one of the subset of entities in the recovery plan;

identifying the witness from the recovery plan, based at least in part on the subset of entities in the recovery plan; and initiating actions to implement the recovery plan using the identified witness to elect the leader.

2. The non-transitory computer readable medium of claim 1, wherein the event in the virtualization system is at least one of, unreachability of a node of the virtualization system, or a failure of a virtual machine of the virtualization system, or a loss of function of an entity of the virtualization system.

3. The non-transitory computer readable medium of claim 1, wherein the leader used to implement the recovery in the virtualization system is a node that is referenced in the recovery plan, or an application that is referenced in the recovery plan, or a virtual machine that is referenced in the recovery plan.

4. The non-transitory computer readable medium of claim 1, wherein the witness is one particular witness from among a plurality of witnesses that are distributed in different fault domains.

5. The non-transitory computer readable medium of claim 1, wherein the witness is in a first fault domain that is different from a second fault domain of the leader.

6. The non-transitory computer readable medium of claim 1, wherein the event in the virtualization system affects a first virtualization system component in a first cloud environment, and wherein implementation of the recovery comprises bring-up of a replacement entity in a second cloud environment.

7. The non-transitory computer readable medium of claim 6, wherein the event in the virtualization system corresponds to at least one of, degradation of liveness of the first virtualization system component, or a loss of communication with the first virtualization system component, or a decrease of health of the first virtualization system component, or a loss of function of the first virtualization system component.

8. A method comprising:
configuring a recovery plan to address a recovery in a virtualization system, wherein the recovery plan identifies a witness that corresponds to a subset of entities of the virtualization system, and wherein the witness is used to elect a leader to implement the recovery in the virtualization system;
identifying an event in the virtualization system that triggers the recovery, wherein the recovery is of at least one of the subset of entities in the recovery plan;
identifying the witness from the recovery plan, based at least in part on the subset of entities in the recovery plan; and
initiating actions to implement the recovery plan using the identified witness to elect the leader.

9. The method of claim 8, wherein the event in the virtualization system is at least one of, unreachability of a node of the virtualization system, or a failure of a virtual machine of the virtualization system, or a loss of function of an entity of the virtualization system.

10. The method of claim 8, wherein the leader used to implement the recovery in the virtualization system is a node that is referenced in the recovery plan, or an application that is referenced in the recovery plan, or a virtual machine that is referenced in the recovery plan.

11. The method of claim 8, wherein the witness is one particular witness from among a plurality of witnesses that are distributed in different fault domains.

12. The method of claim 8, wherein the witness is in a first fault domain that is different from a second fault domain of the leader.

13. The method of claim 8, wherein the event in the virtualization system affects a first virtualization system component in a first cloud environment, and wherein implementation of the recovery comprises bring-up of a replacement entity in a second cloud environment.

14. The method of claim 13, wherein the event in the virtualization system corresponds to at least one of, degradation of liveness of the first virtualization system component, or a loss of communication with the first virtualization system component, or a decrease of health of the first virtualization system component, or a loss of function of the first virtualization system component.

15. A system comprising:
a storage medium having stored thereon a sequence of instructions; and
a processor that executes the sequence of instructions to cause the processor to perform acts comprising,
configuring a recovery plan to address a recovery in a virtualization system, wherein the recovery plan identifies a witness that corresponds to a subset of entities of the virtualization system, and wherein the witness is used to elect a leader to implement the recovery in the virtualization system;
identifying an event in the virtualization system that triggers the recovery, wherein the recovery is of at least one of the subset of entities in the recovery plan;
identifying the witness from the recovery plan, based at least in part on the subset of entities in the recovery plan; and
initiating actions to implement the recovery plan using the identified witness to elect the leader.

16. The system of claim 15, wherein the event in the virtualization system is at least one of, unreachability of a node of the virtualization system, or a failure of a virtual machine of the virtualization system, or a loss of function of an entity of the virtualization system.

17. The system of claim 15, wherein the leader used to implement the recovery in the virtualization system is a node that is referenced in the recovery plan, or an application that is referenced in the recovery plan, or a virtual machine that is referenced in the recovery plan.

18. The system of claim 15, wherein the witness is one particular witness from among a plurality of witnesses that are distributed in different fault domains.

19. The system of claim 15, wherein the witness is in a first fault domain that is different from second fault domain of the leader.

20. The system of claim 15, wherein the event in the virtualization system affects a first virtualization system component in a first cloud environment, and wherein implementation of the recovery comprises bring-up of a replacement entity in a second cloud environment.

21. The system of claim 20, wherein the event in the virtualization system corresponds to at least one of, degradation of liveness of the first virtualization system component, or a loss of communication with the first virtualization system component, or a decrease of health of the first virtualization system component, or a loss of function of the first virtualization system component.

* * * * *